(12) United States Patent
Katsuta

(10) Patent No.: US 9,256,320 B2
(45) Date of Patent: Feb. 9, 2016

(54) DISPLAY DEVICE, METHOD OF DRIVING DISPLAY DEVICE, AND ELECTRONIC APPARATUS

(71) Applicant: Japan Display Inc., Tokyo (JP)

(72) Inventor: Tadayoshi Katsuta, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/167,069

(22) Filed: Jan. 29, 2014

(65) Prior Publication Data

US 2014/0210752 A1 Jul. 31, 2014

(30) Foreign Application Priority Data

Jan. 30, 2013 (JP) .................................. 2013-016240
Jan. 24, 2014 (JP) .................................. 2014-011046

(51) Int. Cl.
*G09G 5/00* (2006.01)
*G06F 3/041* (2006.01)
*G09G 3/36* (2006.01)
*G06F 3/044* (2006.01)

(52) U.S. Cl.
CPC .............. *G06F 3/0418* (2013.01); *G06F 3/044* (2013.01); *G09G 3/3611* (2013.01)

(58) Field of Classification Search
CPC ..... G06F 3/0418; G06F 3/041; G06F 3/0412; G09G 3/3611; G09G 3/3625; G09G 3/3648; G09G 3/367; G09G 3/3696; G09G 3/3674; G09G 3/3677; G09G 3/3688; G09G 2300/043; G09G 2300/06; G09G 2300/0281; G09G 2310/0283; G09G 3/325
See application file for complete search history.

(56) References Cited

U.S. PATENT DOCUMENTS

2003/0122798 A1* 7/2003 Shin ............................. 345/173
2004/0233228 A1* 11/2004 Ota ............................... 345/690
2007/0075938 A1* 4/2007 Sung et al. ..................... 345/76
2009/0015533 A1* 1/2009 Fujita et al. ..................... 345/92

(Continued)

FOREIGN PATENT DOCUMENTS

JP 2012-048295 A 3/2012
JP 2012-230657 A 11/2012

(Continued)

OTHER PUBLICATIONS

Korean Office Action issued May 19, 2015 for corresponding Korean Application No. 10-2014-11769.

(Continued)

*Primary Examiner* — Adam R Giesy
(74) *Attorney, Agent, or Firm* — Michael Best & Friedrich LLP

(57) ABSTRACT

According to an aspect, a display device includes: a display region in which a plurality of pixels are arranged in a matrix; a plurality of signal lines that extend in a second direction in the display region; a vertical drive circuit that is coupled to first ends of the scanning lines and applies a vertical scanning pulse to the first ends to select each row of the pixels in the display region; a horizontal drive circuit that performs a display operation of supplying an image signal to each of the pixels in the row selected by the vertical drive circuit through the signal lines; and a plurality of switches that are coupled to second ends of the scanning lines respectively. Each of the switches supplies the same potential as that supplied to the first ends by the vertical drive circuit to the second end corresponding thereto in an idle period.

9 Claims, 21 Drawing Sheets

(56) References Cited

U.S. PATENT DOCUMENTS

| | | | |
|---|---|---|---|
| 2012/0105496 A1* | 5/2012 | Komiya | 345/690 |
| 2013/0106811 A1* | 5/2013 | Hirabayashi | 345/204 |
| 2013/0141363 A1* | 6/2013 | Hung et al. | 345/173 |

FOREIGN PATENT DOCUMENTS

| | | |
|---|---|---|
| KR | 200717425 A | 2/2007 |
| KR | 10-2007-0037147 A | 4/2007 |
| KR | 20070037147 A | 4/2007 |

OTHER PUBLICATIONS

Taiwanese Office Action issued Nov. 16, 2015 for corresponding Taiwanese Application No. 103103654.

Korean Office Action issued Nov. 26, 2015 for corresponding Korean Application No. 10- 2014-0011769.

\* cited by examiner

543 DISPLAY UNIT
542 KEYBOARD
541 MAIN BODY

551 UPPER CASING
554 DISPLAY
552 LOWER CASING

551 UPPER CASING
552 LOWER CASING

DISPLAY DEVICE, METHOD OF DRIVING DISPLAY DEVICE, AND ELECTRONIC APPARATUS

CROSS-REFERENCE TO RELATED APPLICATIONS

This application claims priority from Japanese Application No. 2013-016240, filed on Jan. 30, 2013, and Japanese Application No. 2014-011046, filed on Jan. 24, 2014, the contents of which are incorporated by reference herein in its entirety.

BACKGROUND

1. Technical Field

The present invention relates to a display device, a method of driving a display device, and an electronic apparatus, and more particularly, to a display device, a method of driving a display device, and an electronic apparatus that have an idle period in which display is stopped between display operation periods.

2. Description of the Related Art

In recent years, attention has been paid to touch detection devices referred to as so-called touch panels capable of detecting external proximity objects which approach from the outside. The touch panels are mounted on or integrated with a display device such as a liquid crystal display device and are used for display devices with a touch detection function. The display devices with a touch detection function display various button images on the display device, thereby enabling input of information with the touch panel as a substitute for ordinary mechanical buttons. The display devices with a touch detection function, which include such touch panels, do not require input devices such as a keyboard, a mouse, and a keypad, and the use of the display devices tends to increase in portable information devices such as cellular phones as well as in computers.

Types of a touch detection method include several types such as an optical type, a resistive type, and a capacitance type. When touch detection devices of the capacitance type are used in mobile devices and the like, devices having relatively simple structures and low power consumption can be provided. For example, in Japanese Patent Application Laid-open Publication No. 2012-048295 (JP-A-2012-048295), a capacitive touch detection device is disclosed.

In the capacitive touch detection devices, capacitance is formed between a drive electrode and a touch detection electrode and varies in accordance with an external proximity object which approaches from the outside. These display devices use the variation in capacitance and analyze a touch detection signal which appears in the touch detection electrode when a touch detection driving signal is applied to the drive electrode to detect the external proximity object.

In the display devices with a touch detection function in which a display function and a touch detection function are integrated with each other, for example, a touch detection operation may affect display. In contrast, the display device with a touch detection function disclosed in JP-A-2012-048295 detects a touch in a touch detection operation period different from a display operation period, that is, an idle period in which display is stopped between display operations. Therefore, it is possible to reduce the influence of the touch detection operation on the display operation.

However, when the touch detection driving signal is applied to the drive electrode, the potential of the common electrode for display may be varied. For example, in the display device, when the common electrode for display is also used as one of a pair of electrodes for touch sensing and the other electrode (touch detection electrode) is arranged so as to form capacitance together with the common electrode, a variation in the potential of the common electrode for display may increase. Accordingly, in the idle period in which display is stopped between the display operations, a variation in the potential of the common electrode for display becomes the noise of a scanning line due to the capacitance between the common electrode for display and the scanning line, and the noise may cause a leakage current.

In addition, some display devices without a touch detection function perform, in the idle period in which display is stopped between the display operations, a driving operation other than a display driving operation, such as a drive operation in which the potential of the common electrode for display varies. In this case, similarly, in the idle period, the variation in the potential of the common electrode for display becomes the noise of a scanning line due to the capacitance between the common electrode for display and the scanning line, and the noise may cause a leakage current.

In order to suppress the influence of the noise of the scanning line due to the variation in the potential of the common electrode for display, it is effective that a first gate driver and a second gate driver which are arranged such that the scanning lines are interposed therebetween in the extension direction of the scanning lines may select each row of pixels in a display region from both ends of the scanning lines. However, transistor elements of the first and second gate drivers need to be provided in a frame which does not contribute to the display region. In this case, the size of the frame may increase. When the size of the frame increases, the space of the display region of the display device is limited. Therefore, it is necessary to reduce the number of transistor elements of the first and second gate drivers in the display device.

For the foregoing reasons, there is a need for a display device, a method of driving the display device, and an electronic apparatus that suppress the noise of a scanning line while suppressing the increase in size of a frame.

SUMMARY

According to an aspect, a display device includes: a display region in which a plurality of pixels are arranged in a matrix; a frame region outside the display region; a common electrode that gives a common potential to the corresponding pixels; a plurality of scanning lines that extend in a first direction in the display region; a plurality of signal lines that extend in a second direction in the display region; first and second vertical drive circuits that are arranged in the frame region such that the scanning lines are interposed therebetween in the first direction, the first and second vertical drive circuits being configured to alternately apply a vertical scanning pulse in the first direction to select each row of the pixels in the display region; a horizontal drive circuit that performs a display operation of supplying an image signal to each of the pixels in the row selected by the first vertical drive circuit or the second vertical drive circuit through the signal lines; and a plurality of switches each of which is coupled to an end opposite to a vertical drive circuit connection end of each scanning line which is coupled to the first vertical drive circuit or the second vertical drive circuit. The switches supply the same potential as that supplied to the scanning line by the first vertical drive circuit or the second vertical drive circuit to the scanning line in an idle period in which the horizontal drive circuit stops the display operation.

According to another aspect, a method is for driving a display device including: a display region in which a plurality of pixels are arranged in a matrix; a plurality of signal lines that extend in a second direction in the display region; first and second vertical drive circuits that are arranged in the frame region such that the scanning lines are interposed therebetween in the first direction, the first and second vertical drive circuits being configured to alternately apply a vertical scanning pulse in the first direction to select each row of the pixels in the display region; a horizontal drive circuit that performs a display operation of supplying an image signal to each of the pixels in the row selected by the first vertical drive circuit or the second vertical drive circuit through the signal lines; and a plurality of switches each of which is coupled to an end opposite to a vertical drive circuit connection end of each scanning line which is coupled to the first vertical drive circuit or the second vertical drive circuit. The method includes: the switches supplying the same potential as that supplied to the scanning line by the first vertical drive circuit or the second vertical drive circuit to the scanning line in an idle period in which the horizontal drive circuit stops the display operation.

According to another aspect, an electronic apparatus has the display device.

According to another aspect, a display device includes: a display region in which a plurality of pixels are arranged in a matrix; a frame region outside the display region; a plurality of scanning lines that extend in a first direction in the display region; a plurality of signal lines that extend in a second direction in the display region; a vertical drive circuit that is coupled to first ends of the scanning lines and applies a vertical scanning pulse to the first ends to select each row of the pixels in the display region; a horizontal drive circuit that performs a display operation of supplying an image signal to each of the pixels in the row selected by the vertical drive circuit through the signal lines; and a plurality of switches that are coupled to second ends of the scanning lines respectively. Each of the switches supplies the same potential as that supplied to the first ends by the vertical drive circuit to the second end corresponding thereto in an idle period in which the horizontal drive circuit stops the display operation.

DETAILED DESCRIPTION

Modes for carrying out the present disclosure (embodiments) will be described in detail with reference to the drawings. However, the present disclosure is not limited to the contents described in the following embodiments. Each constituent element described below includes elements that can be easily conceived by those skilled in the art, elements that are substantially identical thereto. Further, the constituent elements described below may be appropriately combined. The description will be presented in the following order.

Figure 1:
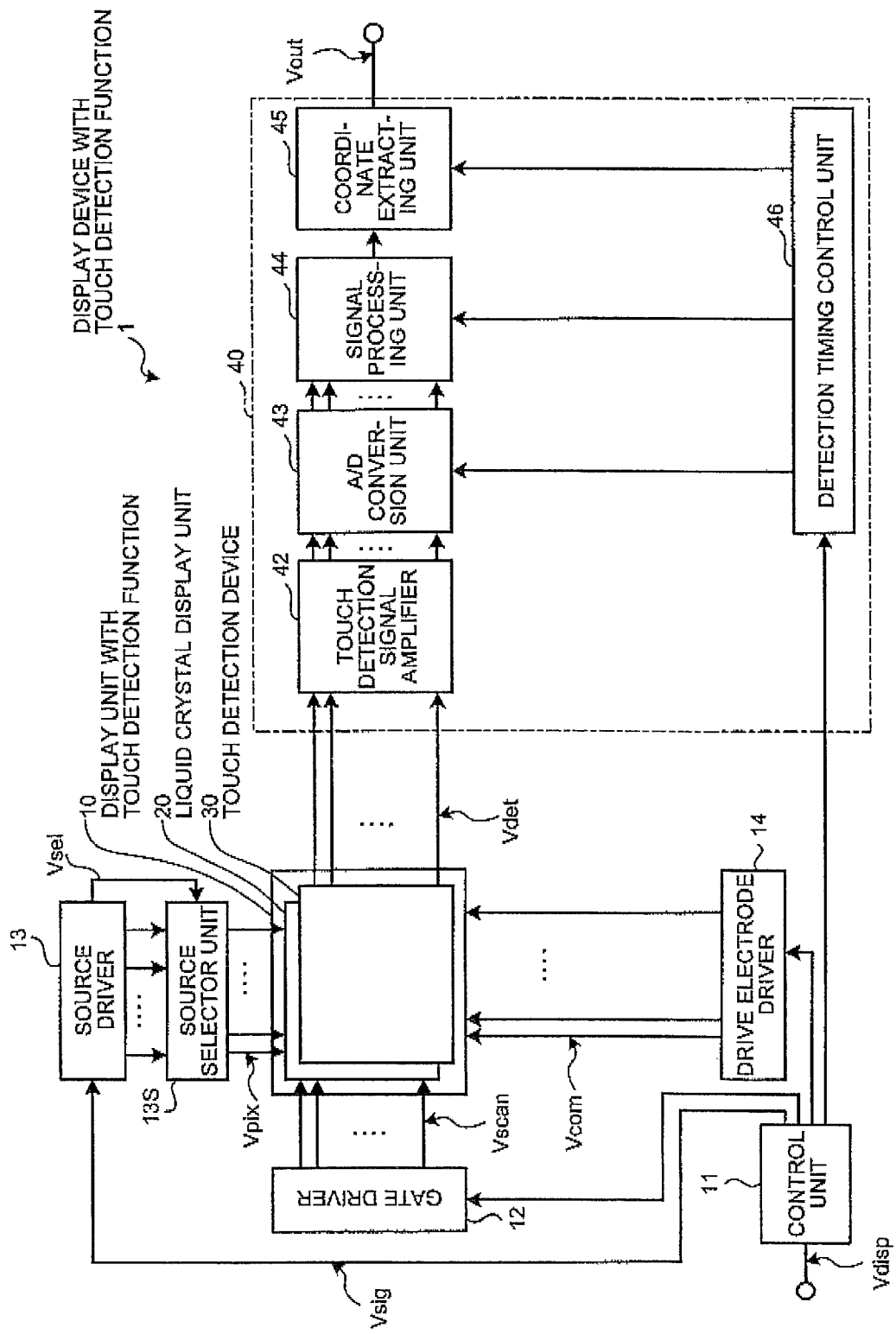
FIG. 1 is a block diagram illustrating an example of the configuration of a display device with a touch detection function according to an embodiment.

1. Embodiment
1-1. Display Device with Touch Detection Function
1-2. Display Device
2. Application Examples (Electronic Apparatuses)
Examples in which Display Device according to Embodiment is Applied to Electronic Apparatus
3. Aspects of Disclosure
1. Embodiment
1-1. Display Device with Touch Detection Function
1-1A. Example of Configuration
Example of Overall Configuration FIG. 1 is a block diagram illustrating an example of the configuration of a display device with a touch detection function according to an embodiment. The display device 1 with a touch detection function includes a display unit 10 with a touch detection function, a control unit 11, a gate driver 12, a source driver 13, a source selector unit 13S, a drive electrode driver 14, and a touch detection unit 40. The display device 1 with a touch detection function is a display device is which the display unit 10 with a touch detection function has a touch detection function. The display unit 10 with a touch detection function is a device in which a liquid crystal display unit 20 using a liquid crystal display element as a display element is integrated with a capacitive touch detection device 30. The display unit 10 with a touch detection function may be a device in which the capacitive touch detection device 30 is mounted on the liquid crystal display unit 20 which uses the liquid crystal display element as the display element.

The liquid crystal display unit 20 sequentially scans horizontal lines one by one in response to scanning signals Vscan supplied from the gate driver 12 to perform display, as described later. The control unit 11 is a circuit that supplies control signals to the gate driver 12, the source driver 13, the drive electrode driver 14, and the touch detection unit 40 on the basis of a video signal Vdisp supplied from the outside such that the gate driver 12, the source driver 13, the drive electrode driver 14, and the touch detection unit 40 operate in synchronization with each other. In the present disclosure, a control device includes the control unit 11, the gate driver 12, the source driver 13, and the drive electrode driver 14.

The gate driver 12 has a function of sequentially selecting one horizontal line to be driven from among horizontal lines of the display unit 10 with a touch detection function, on the basis of the control signal supplied from the control unit 11.

The source driver 13 is a circuit which supplies a pixel signal Vpix to each pixel Pix (sub-pixel SPix) (which will be described later) of the display unit 10 with a touch detection function on the basis of the control signal supplied from the control unit 11. The source driver 13 performs time-division multiplexing for the pixel signals Vpix for a plurality of sub-pixels SPix of the liquid crystal display unit 20 to generate pixel signals from a video signal Vdisp corresponding to one horizontal line and supplies the generated pixel signals to the source selector unit 13S, as described later. In addition, the source driver 13 generates a selector switch control signal Vsel required to separate the pixel signals Vpix multiplexed into a pixel signal Vsig and supplies the selector switch control signal Vsel and the pixel signal Vsig to the source selector unit 13S. This multiplexing allows the number of lines between the source driver 13 and the source selector unit 13S to be reduced.

The drive electrode driver 14 is a circuit which supplies a touch detection driving signal (hereinafter, also referred to as a touch driving signal) VcomAC and a display driving voltage VCOM, which is a display voltage, to a drive electrode COML, which will be described later, of the display unit 10 with a touch detection function, on the basis of the control signal supplied from the control unit 11.

The touch detection unit 40 is a circuit which detects whether the touch detection device 30 is touched (in the above-mentioned touch or approach state) or not, on the basis of the control signal supplied from the control unit 11 and a touch detection signal Vdet supplied from the touch detection device 30 of the display unit 10 with a touch detection function. When the touch detection device 30 is touched, the touch detection unit 40 calculates, for example, the coordinates of a touch point in a touch detection region. The touch detection unit 40 includes a touch detection signal amplifier 42, an A/D conversion unit 43, a signal processing unit 44, a coordinate extracting unit 45, and a detection timing control unit 46.

The touch detection signal amplifier 42 amplifies the touch detection signal Vdet supplied from the touch detection device 30. The touch detection signal amplifier 42 may include a low-pass analog filter which removes a high-frequency component (noise component) included in the touch detection signal Vdet, and extracts a touch component to output the touch component.

Basic Principle of Capacitive Touch Detection

Figure 2:
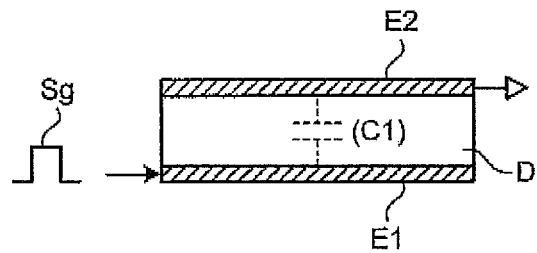
FIG. 2 is a diagram illustrating a state in which a finger is not in contact with or in proximity to a device for illustrating a basic principle of a touch detection method of a capacitance type.
Figure 3:
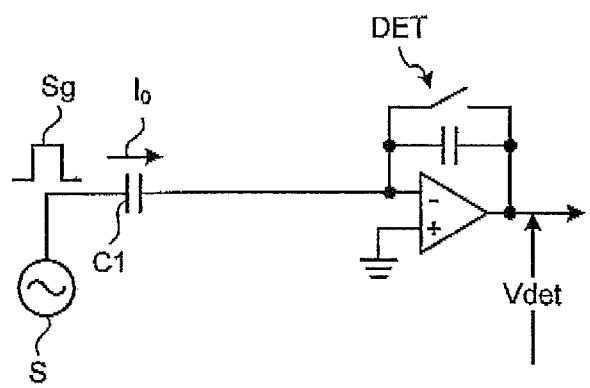
FIG. 3 is a diagram illustrating an example of an equivalent circuit in a state in which a finger is not in contact with or in proximity to a device as illustrated in FIG. 2.
Figure 4:
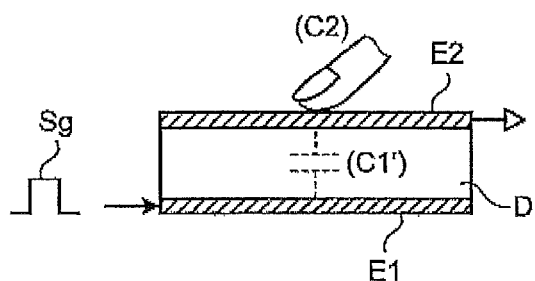
FIG. 4 is a diagram illustrating a state in which a finger is in contact with or in proximity to a device for illustrating a basic principle of a touch detection method of a capacitance type.
Figure 5:
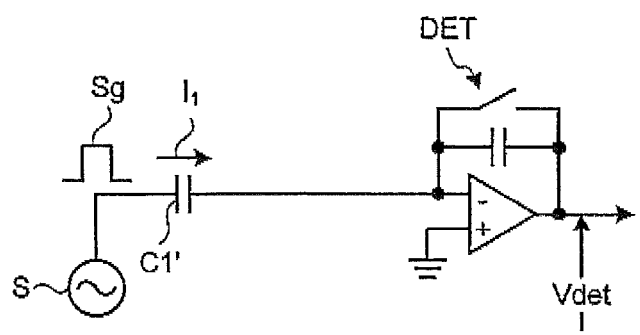
FIG. 5 is a diagram illustrating an example of an equivalent circuit in a state in which a finger is not in contact with or in proximity to a device as illustrated in FIG. 4.
Figure 6:
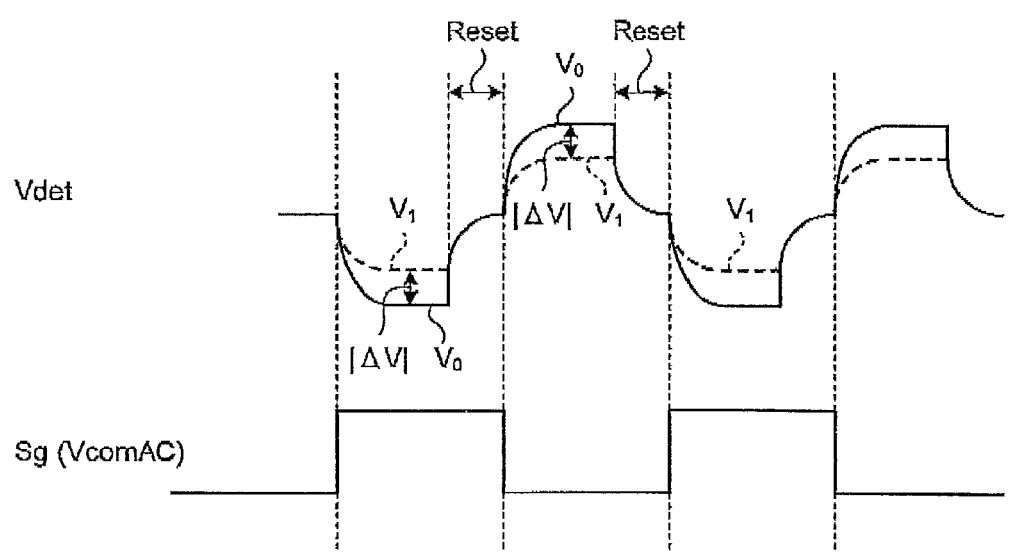
FIG. 6 is a diagram illustrating an example of the waveforms of a driving signal and a touch detection signal.

The touch detection device 30 operates on the basis of the basic principle of capacitive touch detection and outputs the touch detection signal Vdet. The basic principle of the touch detection of the display device 1 with a touch detection function according to the embodiment will be described with reference to FIGS. 1 to 6. FIG. 2 is a diagram illustrating a state in which a finger is not in contact with or in proximity to a device for illustrating a basic principle of a touch detection method of a capacitance type. FIG. 3 is a diagram illustrating an example of an equivalent circuit in a state in which a finger is not in contact with or in proximity to a device as illustrated in FIG. 2. FIG. 4 is a diagram illustrating a state in which a finger is in contact with or in proximity to a device for illustrating a basic principle of a touch detection method of a capacitance type. FIG. 5 is a diagram illustrating an example of an equivalent circuit in a state in which a finger is not in contact with or in proximity to a device as illustrated in FIG. 4. FIG. 6 is a diagram illustrating an example of the waveforms of the driving signal and the touch detection signal.

For example, as illustrated in FIG. 2, a capacitive element C1 includes a pair of electrodes, that is, a drive electrode E1 and a touch detection electrode E2 which face each other with a dielectric D interposed therebetween. As illustrated in FIG. 3, the capacitive element C1 includes one end coupled to an AC signal source (driving signal source) S and the other end coupled to a voltage detector (touch detection unit) DET. The voltage detector PET is, for example, an integration circuit which is included in the touch detection signal amplifier 42 illustrated in FIG. 1.

When an AC square wave Sg with a predetermined frequency (for example, a frequency of about several kilohertz to several hundreds of kilohertz) is applied from the AC signal source S to the drive electrode E1 (one end of the capacitive element C1), an output waveform (touch detection signal Vdet) appears through the voltage detector DET coupled to the touch detection electrode E2 (the other end of the capacitive element C1). The AC square wave Sg corresponding to a driving signal VcomAC.

In the state (non-contact state) in which the finger is not in contact with (or in proximity to) a device, as illustrated in FIGS. 2 and 3, a current $I_0$ corresponding to the capacitance value of the capacitive element C1, in accordance with the charge and discharge of the capacitive element C1. As illustrated in FIG. 6, the voltage detector DET converts a variation in the current $I_0$ corresponding to the AC square wave Sg into a variation in voltage (a waveform $V_0$ represented by a solid line).

On the other hand, in the state (contact state) in which the finger is in contact with (or in proximity to) a device, as illustrated in FIG. 4, a capacitance C2 which is formed by the finger comes into contact with the touch detection electrode E2 or it is adjacent to the touch detection electrode E2. Therefore, the capacitance corresponding to a fringe between the drive electrode E1 and the touch detection electrode E2 is shielded, and thus the capacitive element C1 acts as a capacitive element C1' with a less capacitance value less. In the equivalent circuit illustrated in FIG. 5, a current $I_1$ flows to the capacitive element C1'. As illustrated in FIG. 6, the voltage detector DET converts a variation in the current corresponding to the AC square wave Sg into a variation in voltage (a waveform $V_1$ represented by a dotted line). In this case, the amplitude of the waveform $V_1$ is less than that of the waveform $V_0$. Therefore, the absolute value $|\Delta V|$ of a voltage difference between the waveform $V_0$ and the waveform $V_1$ varies in accordance with the influence of an object, such as a finger, which approaches from the outside. It is preferable that a period Reset in which the charge and discharge of a capacitor is reset by switching in the circuit according to the frequency of the AC square wave Sg be provided in the operation of the voltage detector DET, in order to accurately detect the absolute value $|\Delta V|$ of the voltage difference between the waveform $V_0$ and the waveform $V_1$.

The touch detection device 30 illustrated in FIG. 1 sequentially scans detection blocks one by one to perform touch detection, in response to the driving signal Vcom (driving signal VcomAC) supplied from the drive electrode driver 14.

The touch detection device 30 outputs the touch detection signal Vdet for each detection block from a plurality of touch detection electrodes TDL, which will be described later, through the voltage detector DET illustrated in FIGS. 3 and 5 and supplies the detection signal Vdet to the A/D conversion unit 43 of the touch detection unit 40.

The A/D conversion unit 43 is a circuit which samples an analog signal output from the touch detection signal amplifier 42 in synchronization with the driving signal VcomAC and converts the analog signal to a digital signal.

The signal processing unit 44 includes a digital filter which reduces a frequency component (noise component) other than the frequency at which the driving signal VcomAC is sampled in the output signal from the A/D conversion unit 43. The signal processing unit 44 is a logic circuit which detects whether the touch detection device 30 is touched or not, on the basis of the output signal from the A/D conversion unit 43. The signal processing unit 44 performs a process of extracting only a voltage difference caused by the finger. The voltage difference caused by the finger is the absolute value $|\Delta V|$ of the difference between the waveform $V_0$ and the waveform $V_1$. The signal processing unit 44 may average the absolute value $|\Delta V|$ per detection block to calculate the average value of the absolute values $|\Delta V|$. The signal processing unit 44 can thereby reduce the influence of noise. The signal processing unit 44 compares the voltage difference caused by the detected finger with a predetermined threshold voltage and determines that the object which approaches from the outside is in the contact state when the voltage difference is equal to or more than the threshold voltage. On the other hand, the signal processing unit 44 determines that the object which approaches from the outside is in the non-contact state when the voltage difference is less than the threshold voltage. In this way, the touch detection unit 40 can perform touch detection.

The coordinate extracting unit 45 is a logic circuit which calculates the touch panel coordinates of a touch when the signal processing unit 44 detects a touch. The detection timing control unit 46 performs control such that the A/D conversion unit 43, the signal processing unit 44, and the coordinate extracting unit 45 operate in synchronization. The coordinate extracting unit 45 outputs the touch panel coordinates as a signal output Vout.

Module

Figure 7:
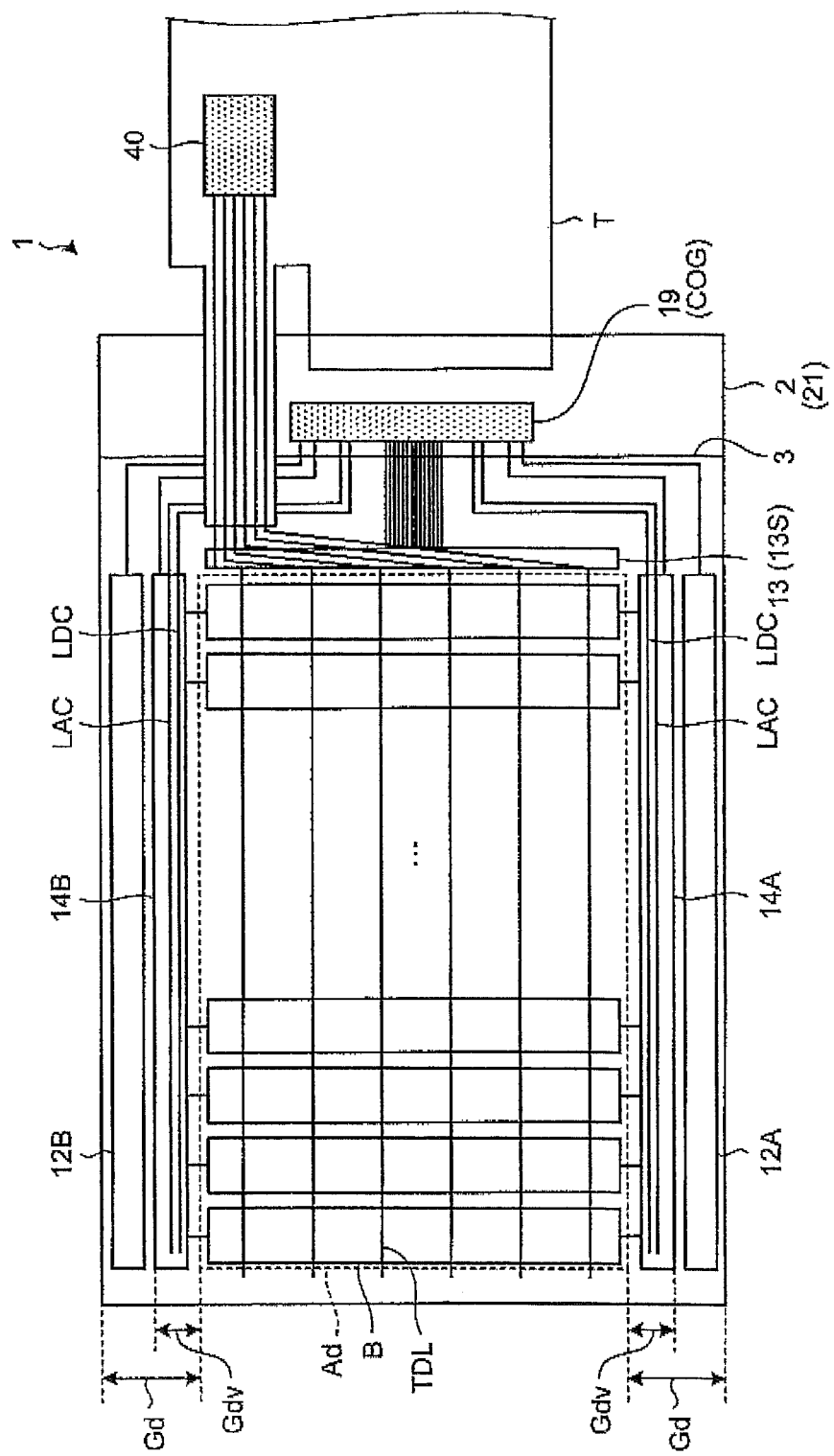
FIG. 7 is a diagram illustrating an example of a module provided with the display device with a touch detection function according to the embodiment.

FIG. 7 is a diagram illustrating an example of a module mounted with the display device with a touch detection function according to the embodiment. As illustrated in FIG. 7, the display device 1 with a touch detection function includes a pixel substrate 2 (TFT substrate 21) and a flexible printed circuit board T. The pixel substrate 2 (TFT substrate 21) has a chip-on-glass (COG) 19 mounted thereon and includes a display region Ad of the liquid crystal display unit 20 and frames Gd. The COG 19 is an IC driver chip mounted on the TFT substrate 21 and is a control device provided with circuits required for a display operation, such as the control unit 11 and the source driver 13 illustrated in FIG. 1. In the embodiment, the source driver 13 and the source selector unit 13S are formed on the TFT substrate 21. The source driver 13 and the source selector unit 13S may be provided in the COG 19. Drive electrode scanning units 14A and 14B which are parts of the drive electrode driver 14 are formed on the TFT substrate 21. The gate driver 12 is formed as gate drivers 12A and 12B on the TFT substrate 21. In the display device 1 with a touch detection function, circuits, such as the drive electrode scanning units 14A and 14B and the gate driver 12, may be provided in the COG 19.

As illustrated in FIG. 7, drive electrode blocks B of the drive electrode COML and touch detection electrodes TDL are formed so as to intersect each other in a direction vertical to the surface of the TFT substrate 21.

The drive electrode COML is divided into a plurality of stripe-shaped electrode patterns which extend in one direction. When a touch detection operation is performed, the drive electrode driver 14 sequentially supplies the driving signal VcomAC to each electrode pattern. Electrode patterns which are supplied with the driving signal VcomAC at the same time, among the plurality of stripe-shaped electrode patterns of the drive electrode COML, correspond to one drive electrode blocks B illustrated in FIG. 7. The drive electrode blocks B (drive electrode COML) extend along the first side of the display unit 10 with a touch detection function and the touch detection electrodes TDL extend along the second side of the display unit 10 with a touch detection function. The first side and the second side extend in directions different from each other. The output portion of the touch detection electrodes TDL is provided, for example, in an end portion bear the second side of the display unit 10 with a touch detection function and is coupled to the touch detection unit 40 mounted on the flexible printed circuit board T through the flexible printed circuit board T. As such, the touch detection unit 40 is mounted on the flexible printed circuit board T and is coupled to each of the plurality of touch detection electrodes TDL which are provided in parallel to each other. The flexible printed circuit board T is not limited to a flexible printed circuit board, but may be a terminal. In this case, the touch detection unit 40 is provided outside the module.

A driving signal generating unit, which will be described later, is provided in the COG 19. The source selector unit 13S is formed by using a TFT element and is provided in the vicinity of the display region Ad on the TFT substrate 21. A plurality of pixels Pix (sub-pixels SPix), which will be described below, are arranged in a matrix (in row/column pattern) in the display region Ad. The frames Gd are regions in which the pixel Pix is not arranged, when viewed from the direction vertical to the surface of the TFT substrate 21. The gate driver 12 and the drive electrode scanning units 14A and 14B of the drive electrode driver 14 are arranged in the frames Gd.

The gate driver 12 includes gate drivers 12A and 1213, and is formed by using a plurality of TFT elements on the TFT substrate 21. The gate drivers 12A and 12B are configured to alternately drive the display region Ad from one side in the direction (scanning direction) in which they face each other with the display region Ad interposed therebetween. In the following description, the gate driver 12A is referred to as a first gate driver 12A and the gate driver 12B is referred to as a second gate driver 12B. Scanning lines GCL, which will be described below, are arranged between the first gate driver 12A and the second gate driver 12B. Therefore, the scanning lines GCL are provided so as to extend in parallel to the extension direction of the drive electrode COML, in the direction vertical to the surface of the TFT substrate 21.

The drive electrode scanning units 14A and 14B are formed by using TFT elements on the TFT substrate 21. The drive electrode scanning units 14A and 14B are supplied with the display driving voltage VCOM from the driving signal generating unit through lines LDC for display and supplied with the driving signal VcomAC from the driving signal generating unit through lines LAC for touch. The drive electrode scanning units 14A and 14B occupy a predetermined width Gdv of the frame Gd, respectively. The drive electrode scanning units 14A and 14B are configured to drive the plurality of drive electrode blocks B which are provided in parallel to each other from both sides. The line LDC for display through which the display driving voltage VCOM is supplied and the line LAC for touch through which the touch driving signal VcomAC is supplied are arranged in parallel in each of the frames Gd. The line LDC for display is arranged closer to the display region Ad than the line LAC for touch. This configuration enables the display driving voltage VCOM supplied through the line LDC for display to stabilize the potential state of the ends of the display region Ad. Therefore, display is stabilized, in particular, in a liquid crystal display unit using horizontal electric field mode liquid crystal.

The display device 1 with a touch detection function illustrated in FIG. 7 outputs the touch detection signal Vdet from one side of the display unit 10 with a touch detection function. Therefore, in the display device 1 with a touch detection function, it is easy to perform wiring upon connecting the display unit 10 with a touch detection function to the touch detection unit 40 through the flexible printed circuit board T which is a terminal portion.

Display Unit with Touch Detection Function

Figure 8:
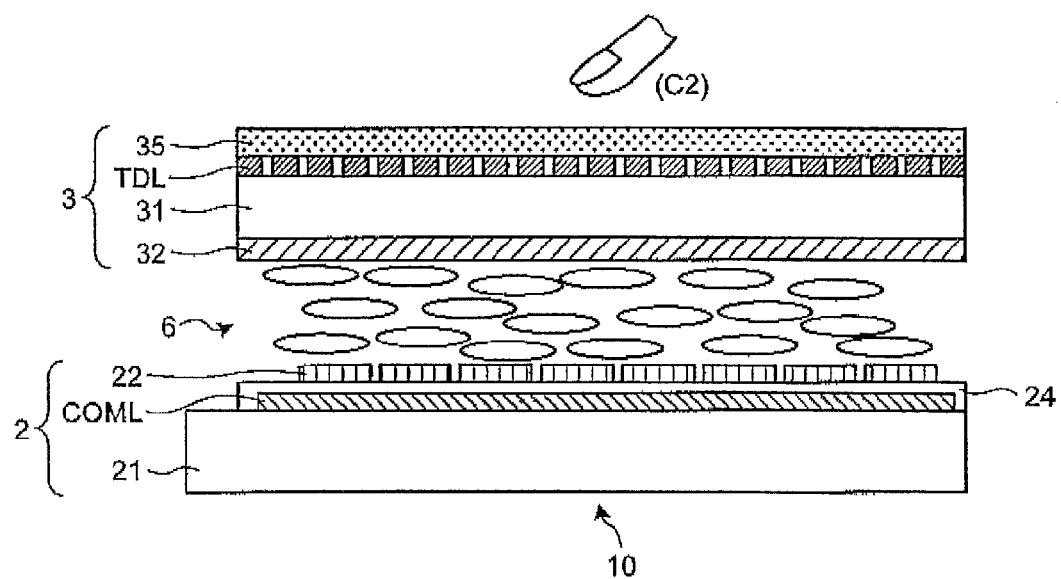
FIG. 8 is a cross-sectional view illustrating the schematic cross-sectional structure of the display unit with a touch detection function according to the embodiment.
Figure 9:
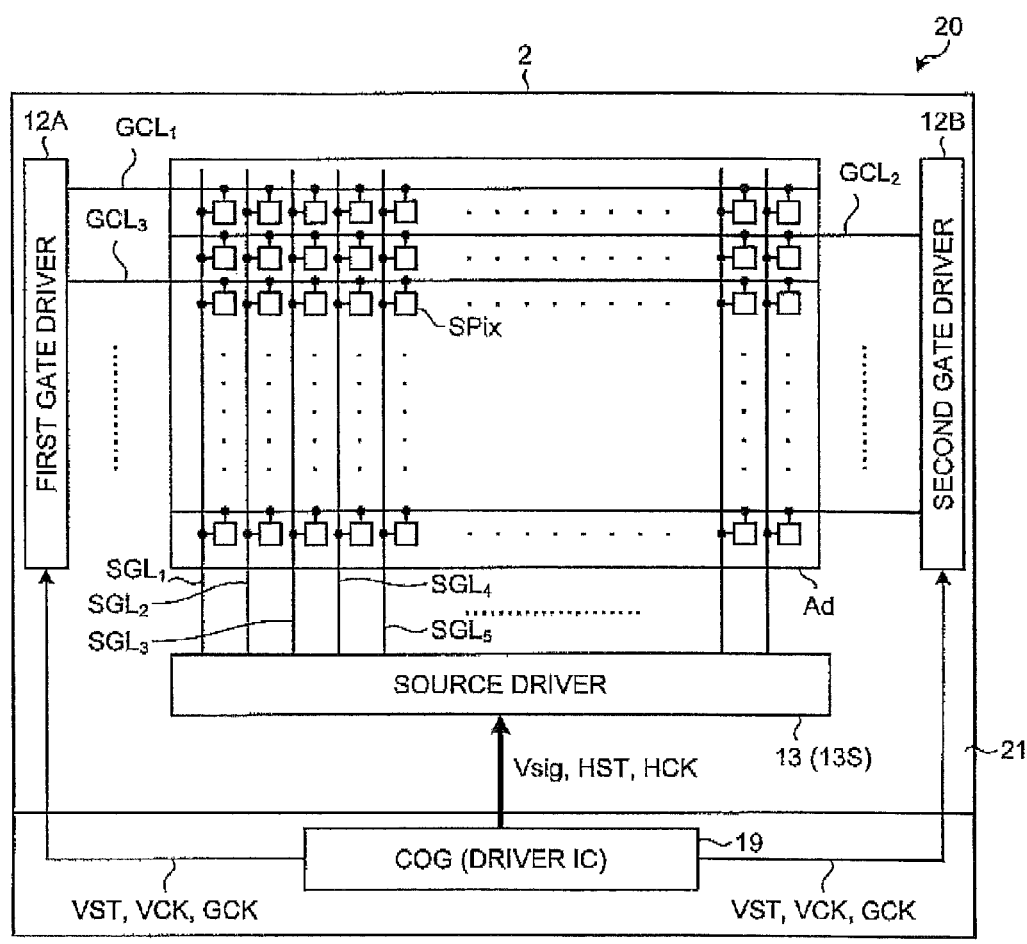
FIG. 9 is a diagram illustrating an example of a control device of the display device with a touch detection function according to the embodiment.
Figure 10:
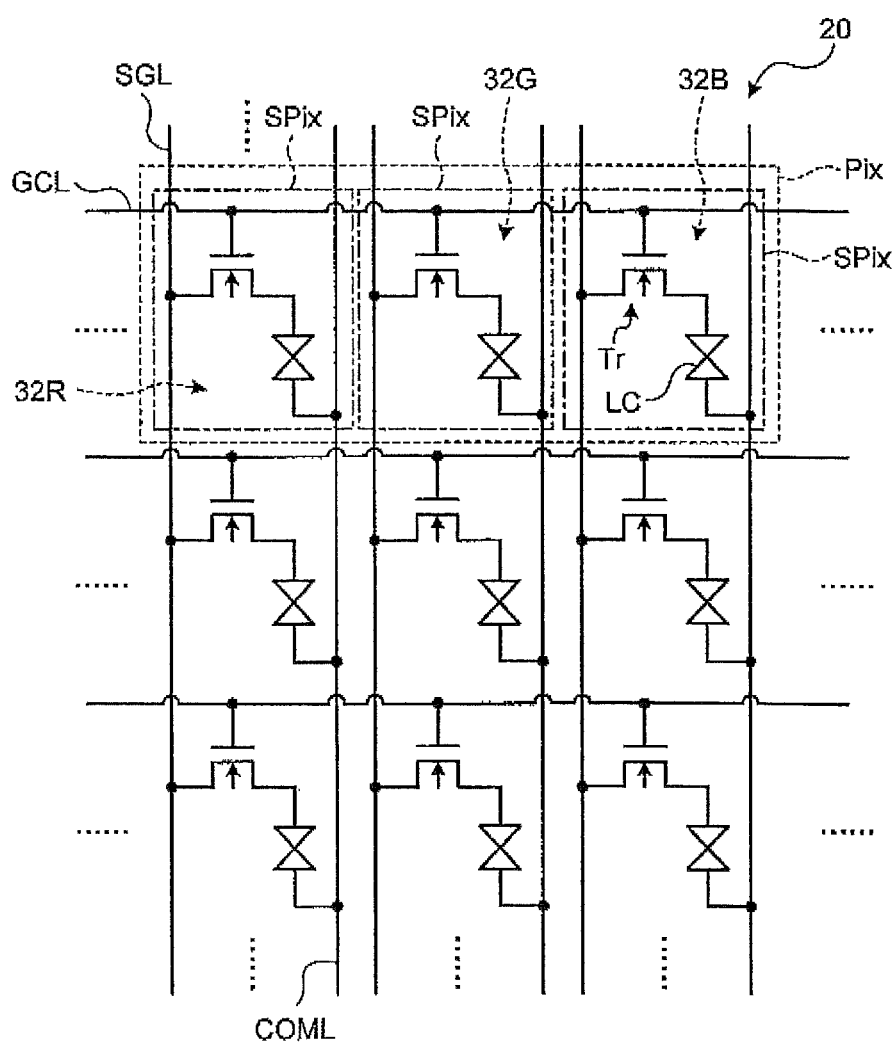
FIG. 10 is a circuit diagram illustrating the arrangement of pixels in the display unit with a touch detection function according to the embodiment.

An example of the structure of the display unit 10 with a touch detection function will be described. FIG. 8 is a cross-sectional view illustrating the schematic cross-sectional structure of the display unit with a touch detection function according to the embodiment. FIG. 9 is a diagram illustrating an example of the control device of the display device with a touch detection function according to the embodiment. FIG. 10 is a circuit diagram illustrating the arrangement of the pixels in the display unit with a touch detection function according to the embodiment.

As illustrated in FIG. 8, the display unit 10 with a touch detection function includes the pixel substrate 2, a counter substrate 3 which faces the pixel substrate 2 in a direction vertical to the surface of the pixel substrate 2, and a liquid crystal layer 6 which is provided between the pixel substrate 2 and the counter substrate 3.

The liquid crystal layer 6 modulates light passing therethrough according to the state of the electric fields, and, for example, a liquid crystal display unit using horizontal electric field mode liquid crystal such as fringe field switching (FFS) mode or in-plane switching (IPS) mode is used as the liquid crystal layer 6. An orientation film may be provided between the liquid crystal layer 6 and the pixel substrate 2, and between the liquid crystal layer 6 and the counter substrate 3 illustrated in FIG. 8, respectively.

The counter substrate 3 includes a glass substrate 31 and a color filter 32 which is formed on one surface of the glass substrate 31. The touch detection electrodes TDL, which are detection electrodes of the touch detection device 30, are formed on the other surface of the glass substrate 31 and a polarizing plate 35 is provided on the touch detection electrodes TDL.

The pixel substrate 2 includes the TFT substrate 21 which serves as a circuit board, a plurality of pixel electrodes 22 which are arranged in a matrix on the TFT substrate 21, a plurality of drive electrodes COML formed between the TFT substrate 21 and the pixel electrodes 22, and an insulating layer 24 which insulates the pixel electrodes 22 and the drive electrodes COml from each other.

Example of System Configuration of Display device

The pixel substrate 2 includes the display region Ad, the COG 19 having the functions of an interface (I/F) and a timing generator, the first gate driver 12A, the second gate driver 12B, and the source driver 13 which are provided on the TFT substrate 21. The flexible printed circuit board T illustrated in FIG. 7 transmits an external signal to the COG 19 and power for driving the COG 19. The pixel substrate 2 includes the display region Ad, the source driver (horizontal drive circuit) 13, and the gate drivers (vertical drive circuits) 12A and 12B. The display region Ad is provided on the surface of the TFT substrate 21 which is a transparent insulating substrate (for example, a glass substrate), and in the display region Ad a plurality of sub-pixels (pixels) each including a liquid crystal element are arranged in a matrix. The gate drivers (vertical drive circuits) 12A and 12B are the first gate driver 12A and the second gate driver 12B and are arranged such that the display region Ad is interposed therebetween.

The display region Ad has a matrix structure in which the sub-pixels SPix each including a liquid crystal element are arranged in a matrix of M rows and N columns. In this specification, the row means a pixel row including N sub-pixels SPix which are arranged in one direction. In addition, the column means a pixel column including M sub-pixels SPix which are arranged in a direction perpendicular to the direction in which sub-pixels SPix are arranged in the row. The values of M and N are determined by a display resolution in the vertical direction and a display resolution in the horizontal direction. In the display region Ad, which is the arrangement of M×N sub-pixels Spix, scanning lines $GCL_1$, $GCL_2$, $GCL_3$, ... $GCL_m$ are arranged for each row of sub-pixels and signal lines $SGL_1$, $SGL_2$, $SGL_3$, $SGL_4$, $SGL_5$, ... $SGL_N$ are arranged for each column of sub-pixels. Hereinafter, in the embodiment, in some cases, the scanning lines $GCL_1$, $GCL_2$, $GCL_3$, ... are referred to as the scanning lines GCL and the signal lines $SGL_1$, $SGL_2$, $SGL_3$, $SGL_4$, $SGL_5$, ... are referred to as the lines SGL. Further, in the embodiment, any three optical scanning lines of the scanning lines $GCL_1$, $GCL_2$, $GCL_3$, ... $GCL_M$ may be referred to as the scanning lines $GCL_m$, $GCL_{m+1}$, $GCL_{m+2}$ (m is a natural number and satisfies m≤M-2 (m is equal to or less than M-2)), and any three optical scanning lines of the signal lines $SGL_1$, $SGL_2$, ... $SGL_N$ may be referred to as the signal lines $SGL_n$, $SGL_{n+1}$, $SGL_{n+2}$ (n is a natural number and satisfies n≤N-2 (n is equal to or less than N-2)).

A master clock, a horizontal synchronization signal, and a vertical synchronization signal, which are external signals, are input to the pixel substrate 2 from the outside and then supplied to the COG 19. The COG 19 converts (increase) levels of the master clock, the horizontal synchronization signal, and the vertical synchronization signal with the voltage amplitude of an external power supply into the voltage amplitude of an internal power supply required to drive the liquid crystal, and supplies a timing generator with the converted signals as the master clock, the horizontal synchronization signal, and the vertical synchronization signal. Thus, the COG 19 generates a vertical start pulse VST, a vertical clock pulse VCK, a switch control signal GCK, a horizontal start pulse HST, and a horizontal clock pulse HCK. The COG 19 supplies the first gate driver 12A and the second gate driver 125 with the vertical start pulse VST, the vertical clock pulse VCK, and the switch control signal GCK, and supplies the source driver 13 with the horizontal start pulse HST and the horizontal clock pulse HCK. The COG 19 generates the display driving voltage VCOM which is commonly supplied to the pixel electrodes of each sub-pixel SPix and is called common potential, and supplies the display driving voltage VCOM to the drive electrode COML.

Figure 17:
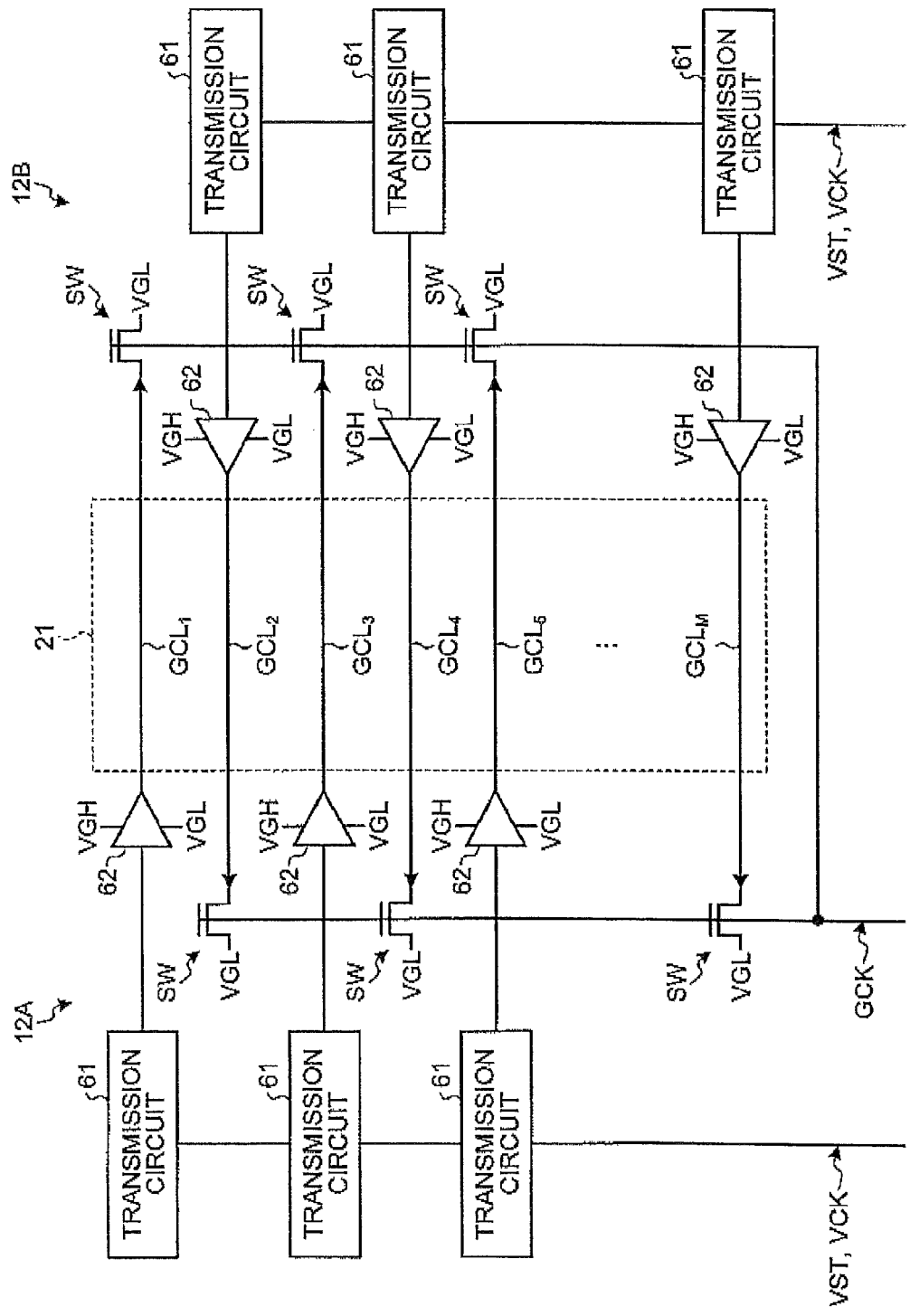
FIG. 17 is a block diagram illustrating a switch according to the embodiment.

The first gate driver 12A and the second gate driver 12B include a transmission circuit 61 and a buffer circuit 62, as illustrated in FIG. 17. The transmission circuit 61 constitutes a shift register and may include a latch circuit. The first gate driver 12A and the second gate driver 12B generate a vertical scanning pulse from the vertical start pulse VST and the vertical clock pulse VCK and supply the vertical scanning pulse to the scanning lines GCL to sequentially select each row of the sub-pixels SPix. The first gate driver 12A and the second gate driver 12B are arranged such that the scanning lines GCL are interposed therebetween in the extension direction of the scanning lines GCL. The first gate driver 12A and the second gate driver 12B sequentially output the pulse from the upper side of the display region Ad, that is, the start side in the vertical scanning direction to the lower side of the display region Ad, that is, the end side in the vertical scanning direction. The first gate driver 12A and the second gate driver 12B alternately apply the vertical scanning pulse in the arrangement direction (scanning direction) of the scanning lines GCL to select each row of the sub-pixels SPix in the display region Ad. The first gate driver 12A and the second gate driver 12B, which are arranged at the ends of the scanning lines GCL in the longitudinal direction respectively, alternately apply the vertical scanning pulse to every other row of the scanning lines GCL to select each row of pixels in the display region Ad. Each of the first gate driver 12A and the second gate driver 12B is coupled to one end of scanning lines GCL in the longitudinal direction. Accordingly, it is possible to reduce the number of transistor elements, as compared to the case in which the first gate driver 12A and the second gate driver 12B are coupled to both ends of the scanning lines GCL in the longitudinal direction. Consequently, the display device 1 with a touch detection function can reduce the area of the frames Gd.

For example, 6-bit R (red), G (green), and B (blue) digital image signals Vsig are supplied to the source driver 13. The source driver 13 writes display data to the sub-pixels SPix of the row which is selected by the vertical scanning operation of the first gate driver 12A and the second gate driver 12B through the signal lines SGL in a pixel-by-pixel manner, by pixels, or all at once.

Thin film transistor (TFT) elements Tr of each sub-pixel SPix illustrated in FIG. 10 and lines illustrated in FIGS. 9 and 10, such as the signal lines SGL through which the pixel signal Vpix is supplied to each pixel electrode 22 and the scanning lines GCL used to drive the TFT elements Tr, are formed on the TFT substrate 21. As such, the signal lines SGL extend on the plane parallel to the surface of the TFT substrate 21 and supply the pixel signals Vpix for displaying an image to the pixels. The liquid crystal display unit 20 illustrated in FIG. 10 includes a plurality of sub-pixels SPix which are arranged in a matrix. Each of the sub-pixels SPix includes the TFT elements Tr and a liquid crystal element LC. The TFT element Tr is formed of a thin film transistor. In this example, the TFT element Tr is formed of an n-channel metal oxide semiconductor (MOS) TFT. Further, the TFT element Tr may be formed of a p-channel TFT or a CMOS-TFT. One of a source or a drain of the TFT element Tr is coupled to the signal line SGL, a gate is coupled to the scanning line GCL, and the other of the source and the drain is coupled to one end of the liquid crystal element LC. For example, the one end of the liquid crystal element LC is coupled to the drain of the TFT element Tr and the other end thereof is coupled to the drive electrode COML.

The first gate driver 12A and the second gate driver 12B illustrated in FIG. 9 apply the vertical scanning pulse to the gate of the TFT elements Tr of the sub-pixels SPix through the scanning line GCL illustrated in FIG. 10 to sequentially select, as a display driving target, one row (one horizontal line) of the sub-pixels SPix among the sub-pixels SPix which are arranged in a matrix in the display region Ad. The source driver 13 supplies the pixel signal Vpix to each of the sub-pixels SPix included in one horizontal line which is sequentially selected by the first gate driver 12A and the second gate driver 12B through the signal line SGL. Then, display is performed in one horizontal line of the sub-pixels SPix in response to the supplied pixel signal Vpix. The drive electrode driver 14 applies the display driving signal (display driving voltage VCOM) to drive the drive electrode COML.

As described above, in the display device 1 with a touch detection function, the first gate driver 12R and the second gate driver 12B drive the scanning lines $GCL_m$, $GCL_{m+1}$, and $GCL_{m+2}$ in a sequentially scanning manner to sequentially select one horizontal line. Further, in the display device 1 with a touch detection function, the source driver 13 supplies the pixel signals Vpix to the sub-pixels SPix belonging to one horizontal line and display is performed for each horizontal line. When the display operation is performed, the drive electrode driver 14 applies the driving signal Vcom to the drive electrode COML corresponding to the horizontal line.

In the color filter 32 illustrated in FIG. 8, for example, color regions of red (R), green (G), and blue (B) color filters are cyclically arranged and are associated with sub-pixels Spix illustrated in FIG. 10 in a manner such that a set of R, G, and B color regions of 32R, 32G, and 32B (see FIG. 10) corresponds to a pixel Pix. The color filter 32 faces the liquid crystal layer 6 in a direction perpendicular to the TFT substrate 21. As such, the sub-pixel SPix can display a single color. When the color regions have colors different from the above-mentioned colors, the color filter 32 may be a combination of different colors. The color filter 32 may not be provided. A region in which the color filter 32 is not provided, that is, a transparent sub-pixel SPix may be provided.

The sub-pixel SPix illustrated in FIG. 10 is coupled to other sub-pixels SPix which belong to the same row of the liquid crystal display unit 20 by the scanning line GCL. The scanning line GCL is coupled to the gate driver 12 and the gate driver 12 supplies a scanning signal Vscan to the scanning line GCL. The sub-pixel SPix is coupled to other sub-pixels SPix which belong to the same column of the liquid crystal display unit 20 by the signal line SGL. The signal line SGL is coupled to the source driver 13 and the source driver 13 supplies the pixel signal Vpix to the signal line SGL.

Figure 11:
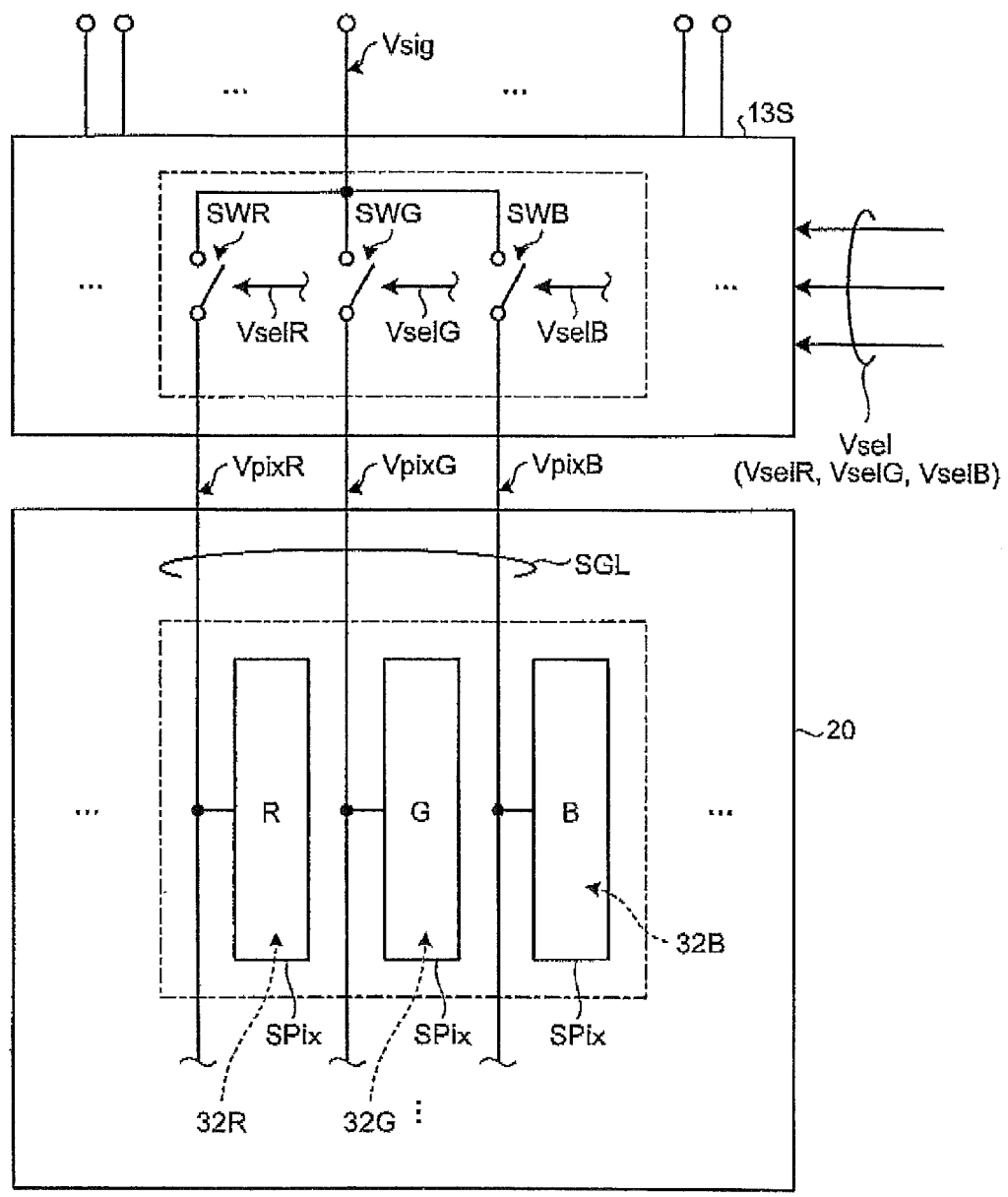
FIG. 11 is a schematic diagram illustrating a relation between a source driver and signal lines in the module provided with the display device with a touch detection function according to the embodiment.

FIG. 11 is a schematic diagram illustrating the relation between the source driver and the signal lines in the module provided with the display device with a touch detection function according to the embodiment. As illustrated in FIG. 11, in the display device 1 with a touch detection function, the signal lines SGL are coupled to the source driver 13 provided in the COG 19 through the source selector unit 13S. The source selector unit 13S performs the on/off (switching) operation in response to the selector switch control signal Vsel.

As illustrated in FIG. 11, the source driver 13 generates the pixel signal Vpix on the basis of the image signal Vsig and the source driver control signal supplied from the control unit 11 and outputs the pixel signal Vpix. The source driver 13 generates pixel signals each of which is obtained by time-division-multiplexing pixel signal Vpix for a plurality of (in this example, three) sub-pixels SPix of the liquid crystal display unit 20 of the display unit 10 with a touch detection function from the image signal Vsig corresponding to one horizontal line, and supplies the multiplexed pixel signals (image signals Vsig) to the source selector unit 13S. Further, the source driver 13 generates a selector switch control signal Vsel (VselR, VselG, and VselB) required to separate the pixel signals Vpix multiplexed into each image signal Vsig and supplies the selector switch control signal Vsel and the image signals Vsig to the source selector unit 13S. This multiplexing makes it possible to reduce the number of lines between the source driver 13 and the source selector unit 13S.

The source selector unit 13S separates the pixel signals Vpix time-division-multiplexed into each image signal Vsig on the basis of the image signals Vsig and the selector switch control signal Vsel supplied from the source driver 13 and supplies the pixel signals Vpix to the liquid crystal display unit 20 of the display unit 10 with a touch detection function.

The source selector unit 13S includes, for example, three switches SWR, SWG, and SWB. One ends of the three switches SWR, SWG, and SWB are coupled to each other and the image signal Vsig is supplied from the source driver 13 to the switches SWR, SWG, and SWB. The other ends of the three switches SWR, SWG, and SWB are coupled to the sub-pixels SPix through the signal lines SGL of the liquid crystal display unit 20 of the display unit 10 with a touch detection function. The three switches SWR, SWG, and SWB are controlled to be turned on and off (switched) by the selector switch control signal Vsel (VselR, VselG, and VselB) supplied from the source driver 13. This configuration enables the source selector unit 13S to sequentially time-divisionally turn on the switches SWR, SWG, and SWB in response to the selector switch control signal Vsel. Thus, the source selector unit 13S separates the pixel signals Vpix (VpixR, VpixG, and VpixB) from the multiplexed image signal Vsig. Then, the source selector unit 13S supplies the pixel signals Vpix to the three sub-pixels SPix, respectively. The red (R), green (G), and blue (B) color regions 32R, 32G, and 32B correspond to the sub-pixels SPix, respectively. Therefore, the pixel signal VpixR is supplied to the sub-pixel SPix corresponding to the color region 32R. The pixel signal VpixG is supplied to the sub-pixel SPix corresponding to the color region 32G. The pixel signal VpixB is supplied to the sub-pixel SPix corresponding to the color region 32B.

The sub-pixel SPix is coupled to other sub-pixels SPix which belong to the same row of the liquid crystal display unit 20 by the drive electrode COML. The drive electrode COML is coupled to the drive electrode driver 14 and the drive electrode driver 14 supplies the display driving voltage VCOM to the drive electrode COML. That is, in this example, a plurality of sub-pixels SPix belonging to the same row share the drive electrode COML.

The gate driver 12 illustrated in FIG. 1 applies the scanning signal Vscan to the gate of the TFT elements Tr of the sub-pixel SPix through the scanning line GCL illustrated in FIG. 10 to sequentially select one row (one horizontal line) of the sub-pixels SPix among the sub-pixels SPix which are arranged in a matrix in the liquid crystal display unit 20 as a display driving target. The source driver 13 illustrated in FIG. 1 supplies the pixel signal Vpix to each of the sub-pixels SPix forming the one horizontal line which is sequentially selected by the gate driver 12 through the signal line SGL illustrated in FIG. 10. Then, display is performed for one horizontal line of the sub-pixels SPix in response to the supplied pixel signals Vpix. The drive electrode driver 14 illustrated in FIG. 1 applies the driving signal Vcom to drive the drive electrodes COML in each drive electrode block B which includes a predetermined number of drive electrodes COML illustrated in FIGS. 7 and 12. The drive electrode block B may include a single drive electrode COML or a plurality of drive electrodes COML.

As described above, the liquid crystal display unit 20 is driven such that the gate driver 12 sequentially time-divisionally scans the scanning lines GCL to sequentially select one horizontal line. In the liquid crystal display unit 20, the source driver 13 supplies the pixel signals Vpix to the sub-pixels Spix belonging to one horizontal line such that display is performed for each horizontal line. When this display operation is performed, the drive electrode driver 14 applies the display driving voltage VCOM to the drive electrode block B including the drive electrodes COML corresponding to the one horizontal line.

Figure 12:
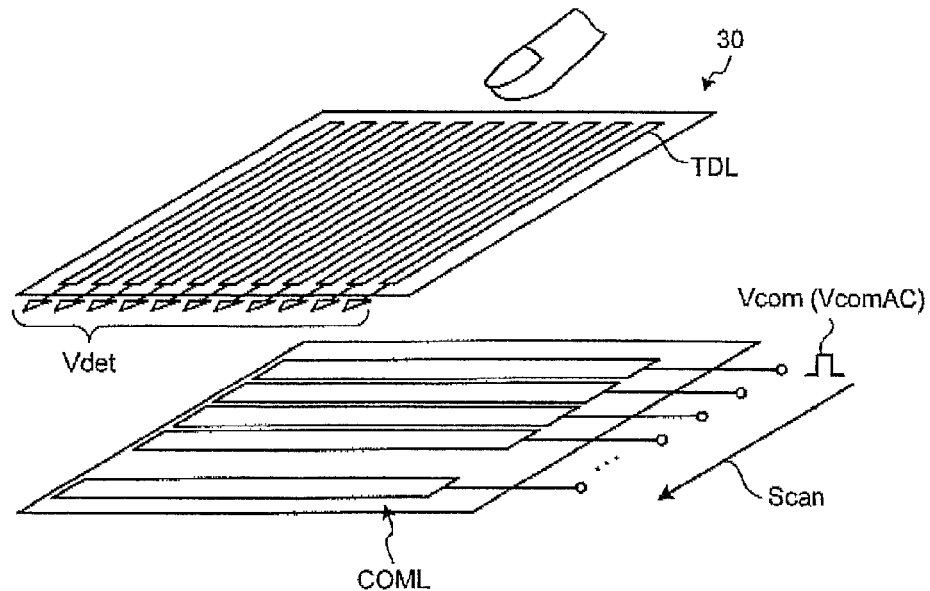
FIG. 12 is a perspective view illustrating an example of the configuration of drive electrodes and touch detection electrodes in the display unit with a touch detection function according to the embodiment.

The drive electrode COML according to the embodiment functions as the drive electrode of the liquid crystal display unit 20 and also functions as the drive electrode of the touch detection device 30. FIG. 12 is a perspective view illustrating an example of the configuration of the drive electrodes and the touch detection electrodes of the display unit with a touch detection function according to the embodiment. The drive electrodes COML illustrated in FIG. 12 face the pixel electrodes 22 in the direction perpendicular to the surface of the TFT substrate 21, as illustrated in FIG. 8. The touch detection device 30 is configured by the drive electrodes COML provided in the pixel substrate 2 and the touch detection electrodes TDL provided in the counter substrate 3. The touch detection electrodes TDL have a stripe-shaped electrode pattern which extends in a direction intersecting a direction in which the electrode patterns of the drive electrodes COML extend. The touch detection electrodes TDL face the drive electrodes COML in the direction perpendicular to the surface of the TFT substrate 21. Each electrode pattern of the touch detection electrode TDL is coupled to the input of the touch detection signal amplifier 42 of the touch detection unit 40. Capacitance is generated at the intersections of the electrode patterns of the drive electrodes COML and the touch detection electrode TDL. In the embodiment, the touch detection electrode TDL and the drive electrode COML (drive electrode block) are divided into a plurality of stripe-shaped portions. However, the embodiment is not limited thereto. For example, at least one of the touch detection electrode TDL and/or the drive electrode COML (drive electrode block) may have a comb shape. Alternatively, the touch detection electrode TDL and/or the drive electrode COML (drive electrode block) may be divided into a plurality of portions and the shape of a slit to divide the drive electrode COML may have a straight line or a curved line.

According to this configuration, when the touch detection device 30 performs the touch detection operation, the drive electrode driver 14 is driven to time-divisionally perform line-sequential scanning for the drive electrode blocks B illustrated in FIG. 7. Then, the drive electrode block B (one detection block) to be applied with the drive electrodes COML is sequentially selected in the scanning direction Scan. Then, the touch detection device 30 outputs the touch detection signals Vdet from the touch detection electrodes TDL. As such, the touch detection device 30 performs touch detection for one detection block.

Figure 13:
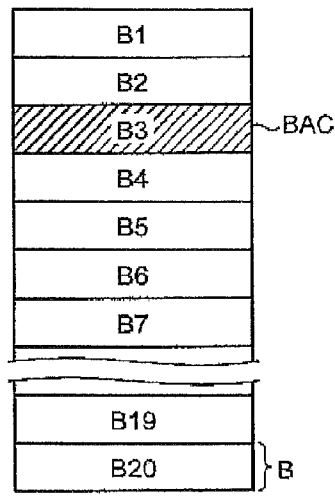
FIG. 13 is a schematic diagram illustrating an example of a touch detection operation of the display device with a touch detection function according to the embodiment.
Figure 14:
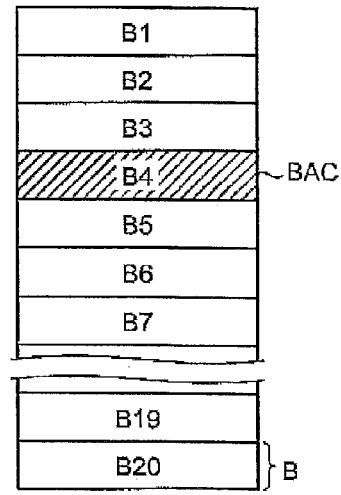
FIG. 14 is a schematic diagram illustrating an example of the touch detection operation of the display device with a touch detection function according to the embodiment.
Figure 15:
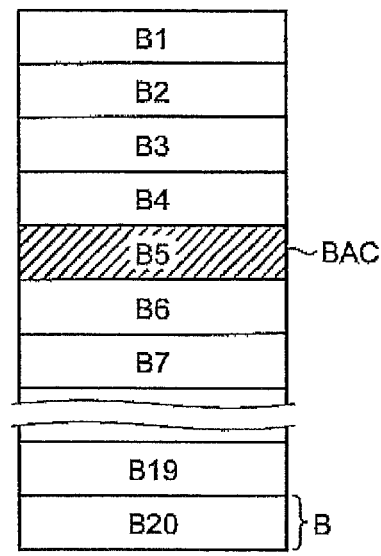
FIG. 15 is a schematic diagram illustrating an example of the touch detection operation of the display device with a touch detection function according to the embodiment.
Figure 16:
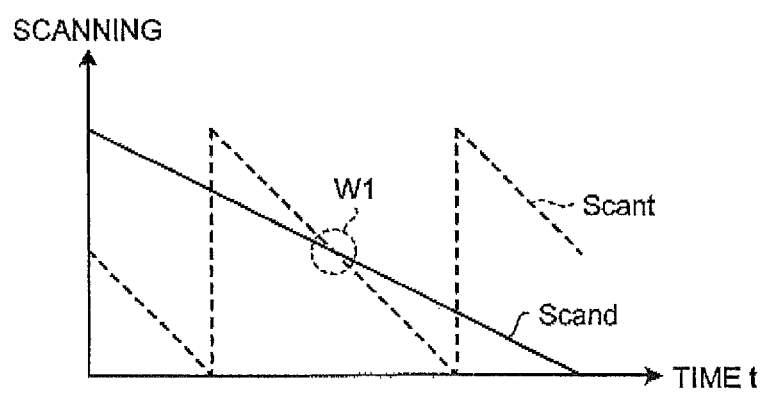
FIG. 16 is a diagram illustrating a display operation and the touch detection operation of the display device with a touch detection function according to the embodiment.

FIGS. 13 to 15 are schematic diagrams illustrating examples of the touch detection operation of the display device with a touch detection function according to the embodiment. FIG. 16 is a diagram illustrating the display operation and touch detection operation of the display device with a touch detection function according to the embodiment. In the drawing, an operation of applying the touch driving signal VcomAC to each of drive electrode blocks B1 to B20 when there are 20 drive electrode blocks B1 to B20 of the drive electrodes COML illustrated in FIG. 7 is illustrated. A driving signal applied block BAC indicates a drive electrode block B to which the touch driving signal VcomAC is applied and the other drive electrode blocks B is supplied with no voltage and is in a so-called floating state in which potential is not fixed. The driving signal applied block BAC may indicate a drive electrode block B to which the touch driving signal VcomAC is applied and the display driving voltage VCOM may be applied to the other drive electrode blocks B such that the potential thereof may be fixed. The drive electrode driver 14 illustrated in FIG. 1 selects the drive electrode block B3 among the drive electrode blocks B to be subjected to the touch detection operation illustrated in FIG. 13 and applies the touch driving signal VcomAC to the drive electrode block B3. Then, the drive electrode driver 14 selects the drive electrode block B4 among the drive electrode blocks B illustrated in FIG. 14 and applies the touch driving signal VcomAC to the drive electrode block B4. Then, the drive electrode driver 14 selects the drive electrode block B5 among the drive electrode blocks B illustrated in FIG. 15 and applies the touch driving signal VcomAC to the drive electrode block B5. As such, the drive electrode driver 14 sequentially selects the drive electrode block B to apply the touch driving signal VcomAC to the selected drive electrode block B, and scans all of the drive electrode blocks B. The number of drive electrode blocks B is not limited to 20.

In the touch detection device 30, one of the drive electrode blocks B illustrated in FIGS. 13 to 15 corresponds to the drive electrode E1 in the basic principle of the capacitive touch detection. In the touch detection device 30, one of the touch detection electrodes TDL corresponds to the touch detection electrode E2. The touch detection device 30 detects a touch according to the above-mentioned basic principle. As illustrated in FIG. 12, the electrode patterns which intersect each other form capacitive touch sensors in a matrix. Therefore, the touch detection device 30 scans the entire touch detection surface to detect the position where an external proximity object touches or approaches.

As illustrated in FIG. 16, the display unit 10 with a touch detection function is driven such that the gate driver 12 time-divisionally performs line-sequential scanning for the scanning lines GCL, thereby performing display scanning Scand. As illustrated in FIG. 16, the display unit 10 with a touch detection function is driven such that the drive electrode driver 14 sequentially selects the drive electrode blocks B, thereby performing touch detection scanning Scant once for a time W1. As illustrated in FIG. 16, the touch detection scanning Scant is performed at a scanning speed which is two times that of the display scanning Scand. As such, in the display device 1 with a touch detection function, since the scanning speed of the touch detection operation is higher than that of the display operation, it is possible to immediately respond to the touch of an external proximity object which approaches from the outside and improve response characteristics to the touch detection operation. The relation between the touch detection scanning Scant and the display scanning Scand is not limited to that illustrated in FIG. 16. For example, the speed of the touch detection scanning Scant may be more than two times the speed of the display scanning Scand, or it may be less than two times the speed of the display scanning Scand.

FIG. 17 is a block diagram illustrating switches according to the embodiment. As described above, the scanning lines $GCL_1$, $GCL_2$, $GCL_3$, ..., $GCL_m$ are provided in the display region Ad. The $GCL_M$ indicates the last scanning line. The first gate driver 12A and the second gate driver 12B each include, for example, the transmission circuits 61 and the buffer circuits 62. The transmission circuits 61 constitute a shift register, and start an operation in response to the vertical start pulse VST. Each of the transmission circuits 61 is sequentially selected in the vertical scanning direction in synchronization with the transmitted vertical clock pulse VCK, and the selected transmission circuits 61 outputs a vertical selection pulse to the corresponding buffer circuit 62.

The buffer circuit 62 receives the vertical selection pulse and transmits a vertical scanning pulse Vgate which supplies a sufficient current to drive the scanning line GCL by using a high-level potential VGH and a low-level potential VGL and. The vertical scanning pulse Vgate will be described below.

In a discharge switch SW, one end of a transistor is coupled to the scanning line GCL, the other end of the transistor is coupled to the low-level potential VGL of the vertical scanning pulse, and a switch control pulse GCK is input to a gate. Therefore, the discharge switch SW can supply the low-level potential VGL of the vertical scanning pulse to the scanning line GCL in response to the input of the switch control signal GCK. As such, the discharge switch SW is coupled to the end which is opposite to a vertical drive circuit connection end of the scanning line GCL coupled to the first gate driver 12A or the second gate driver 12B and can supply the same potential as that of the first gate driver 127 or the second gate driver 12B.

The discharge switches SW include: a plurality of switches that are provided close to the first gate driver 12A and are coupled to the ends opposite to the vertical drive circuit connection ends of the scanning lines GCL which are coupled to the second gate driver 12B through the display region Ad; and a plurality of switches that are provided close to the second gate driver 129 and are coupled to the ends opposite to the vertical drive circuit connection ends of the scanning lines GCL which are coupled to the first gate driver 12A. The discharge switches SW operate at the same time in operative association with each switch which is arranged close to the first gate driver 12A or each switch which is arranged close to the second gate driver 12B. Therefore, it is possible to reduce the number of lines for the switch control signal required to operate the discharge switches SW. As a result, it is possible to reduce the number of lines required to operate the discharge switches SW or the number of circuits for generating the switch control signal and narrow the frame Gd.

The pixel Pix or the sub-pixel SPix corresponds to an example of a "pixel" according to the preset disclosure. The display region Ad corresponds to an example of a "display region" according to the preset disclosure. The frame Gd corresponds to an example of a "frame region" according to the preset disclosure. The drive electrode COML corresponds to an example of a "common electrode" according to the preset disclosure. The scanning line GCL corresponds to an example of a "scanning line" according to the present disclosure. The first gate driver 12A and the second gate driver 12B correspond to an example of "first and second vertical drive circuits" according to the preset disclosure. The source driver 13 corresponds to an example of a "horizontal drive circuit" according to the preset disclosure. The discharge switch SW corresponds to a "switch" according to the preset disclosure.

1-1B. Operation and Effect

Figure 18:
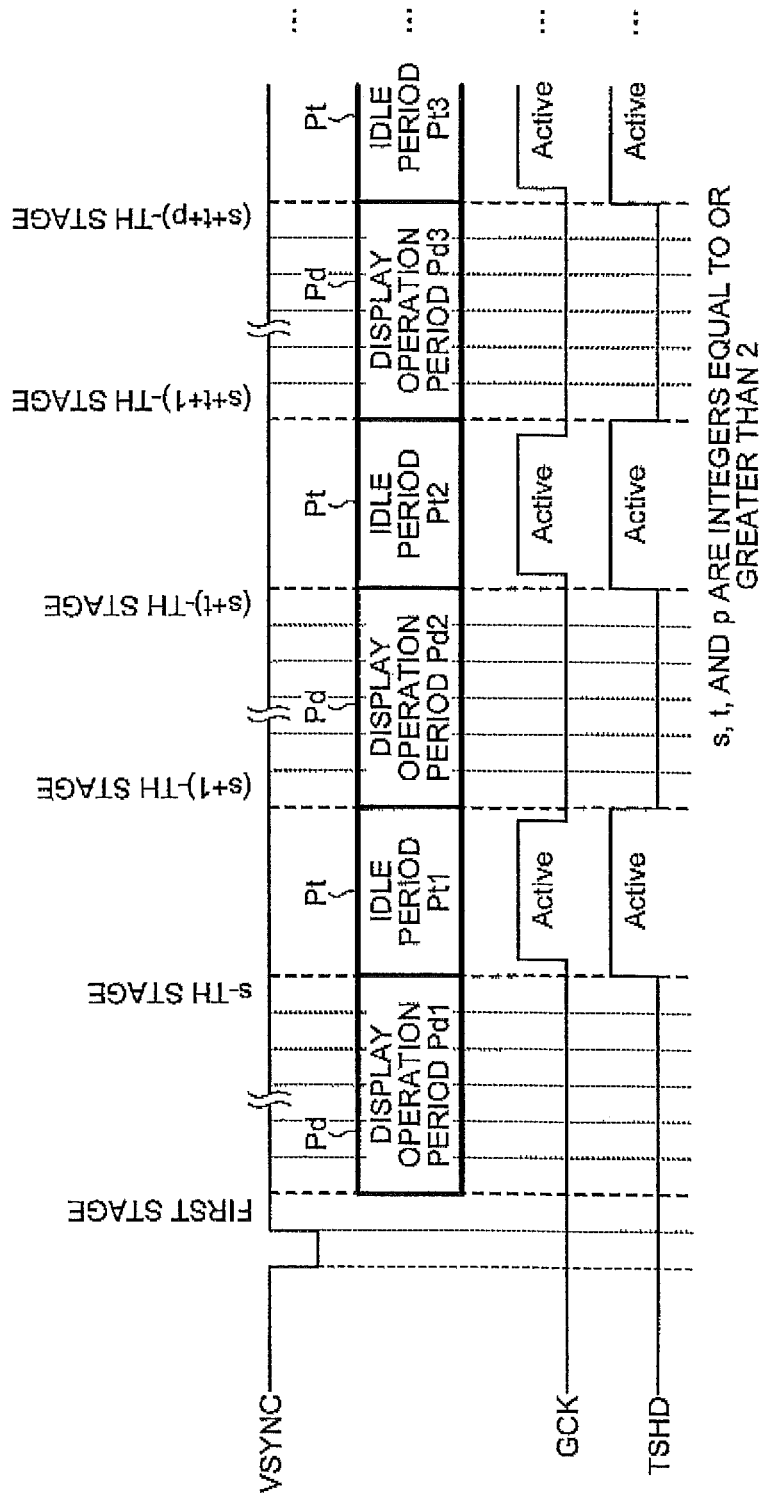
FIG. 18 is a timing chart illustrating a display operation period and an idle period according to the embodiment.
Figure 19:
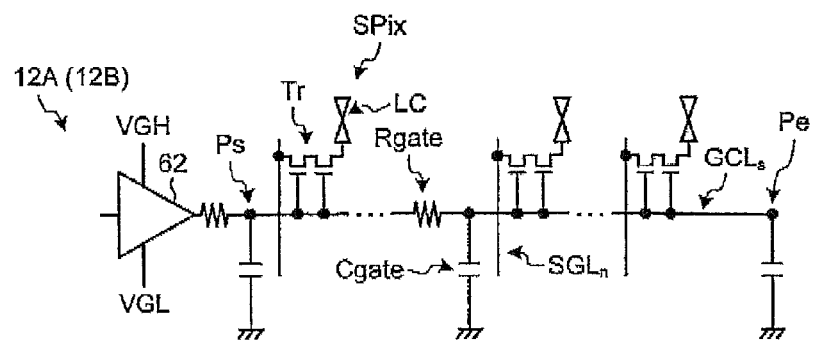
FIG. 19 is a circuit diagram illustrating an example of a scanning line.
Figure 20:
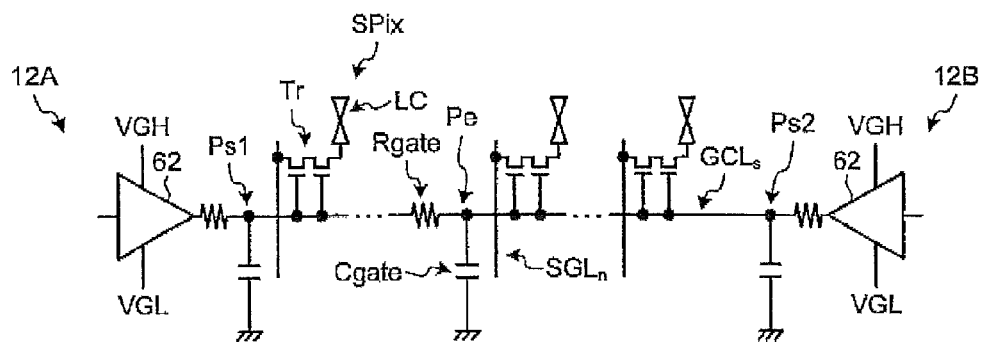
FIG. 20 is a circuit diagram illustrating an example of the scanning line.
Figure 21:
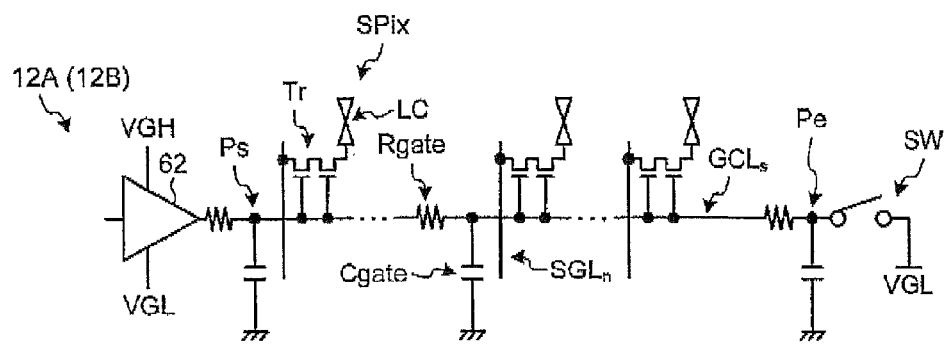
FIG. 21 is a circuit diagram illustrating an example of the scanning line according to the embodiment.
Figure 22:
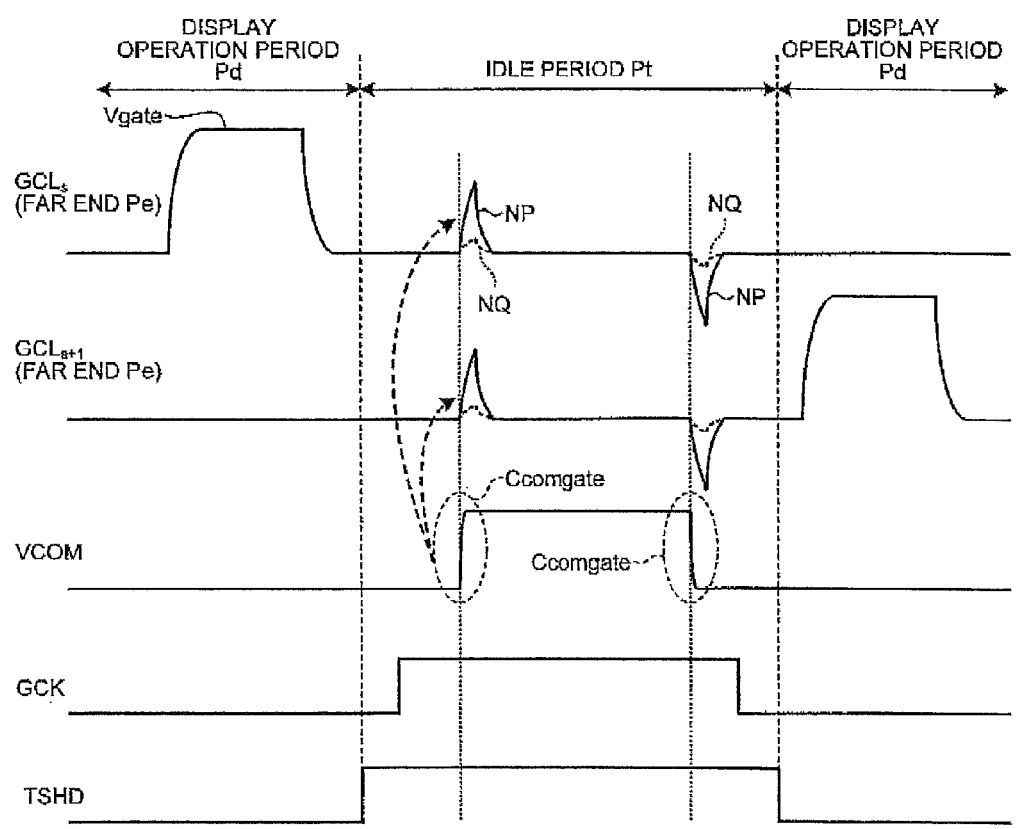
FIG. 22 is a diagram illustrating a variation in the potential of the scanning line according to the embodiment.

The operation and effect of the display device 1 with a touch detection function according to the embodiment will be described. FIG. 18 is a timing chart illustrating a display operation period and an idle period according to the embodiment. FIGS. 19 and 20 are circuit diagrams illustrating an example of the scanning line. FIG. 21 is a circuit diagram illustrating an example of the scanning line according to the embodiment. FIG. 22 is a diagram illustrating a variation in the potential of the scanning line according to the embodiment.

The operation of the display device 1 with a touch detection function according to the embodiment will be described. As illustrated in FIG. 18, the first gate driver 12A and the second gate driver 12B sequentially output the pulse generated from the vertical start pulse VST and the vertical clock pulse VCK as the vertical scanning pulse and supply the vertical scanning pulse to the scanning line GCL to sequentially select each row of the sub-pixels SPix. When a vertical synchronization signal VSYNC is input, the first gate driver 12A and the second gate driver 12B alternately select the scanning line GCL from the first stage in a display operation period Pd (display operation period Pd1) and the source driver 13 performs a display operation of writing display data up to an s-th stage (s is an integer equal to or greater than 2) of the scanning lines GCL through the signal lines SGL. The drive electrode driver 14 supplies the display driving voltage VCOM, which is a display voltage, to the drive electrode COML.

When identifying the high-level potential of a touch detection period identification signal TSHD, the first gate driver 12A and the second gate driver 12B stop the transmission of the vertical scanning pulse, supply a lower-level potential VGL to the scanning lines GCL, and enter an idle period Pt (idle period Pt1). In the idle period Pt, the source driver 13 stops the display operation of writing display data to the sub-pixels SPix through the signal lines SGL. Then, the drive electrode driver 14 supplies the touch driving signal VcomAC to the drive electrode COML of the display unit 10 with a touch detection function, on the basis of the control signal supplied from the control unit 11. The touch detection unit 40 detects whether the touch detection device 30 is touched (in the contact or proximity state) on the basis of the control signal supplied from the control unit 11 and the touch detection signal Vdet supplied from the touch detection device 30 of the display unit 10 with a touch detection function, and calculates, for example, the coordinates of a touch point in the touch detection region when the touch detection device 30 is touched.

When identifying the low-level potential of a touch detection period identification signal TSHD, the first gate driver 12A and the second gate driver 12B resume the transmission of the vertical scanning pulse. When identifying the low-level potential of the touch detection period identification signal TSHD, the drive electrode driver 14 supplies the display driving voltage VCOM, which is a display voltage, to the drive electrode COML. For example, when the low-level potential of the touch detection period identification signal TSHD is input, the first gate driver 12A and the second gate driver 12B alternately select the scanning line GCL from an (s+1)-th stage in the display operation period Pd (display operation period Pd2) and the source driver 13 performs the display operation of writing display data up to an (s+t)-th stage (t is an integer equal to or greater than 2) of the scanning lines GCL through the signal lines SGL.

Then, when identifying the high-level potential of the touch detection period identification signal TSHD (Active), the first gate driver 12A and the second gate driver 12B stop the transmission of the vertical scanning pulse, supply the lower-level potential VGL to the scanning lines GCL, and enter the idle period Pt (idle period Pt2). In the idle period Pt, the source driver 13 stops the display operation of writing display data to the sub-pixels SPix through the signal lines SGL. Then, the drive electrode driver 14 supplies the touch driving signal VcomAC to the drive electrode COML of the display unit 10 with a touch detection function on the basis of the control signal supplied from the control unit 11. The touch detection unit 40 detects whether the touch detection device 30 is touched (in the contact or proximity state) on the basis of the control signal supplied from the control unit 11 and the touch detection signal Vdet supplied from the touch detection device 30 of the display unit 10 with a touch detection function, and calculates, for example, the coordinates of a touch point in the touch detection region when the touch detection device 30 is touched.

When identifying the low-level potential of the touch detection period identification signal TSHD, the first gate driver 12A and the second gate driver 12B resume the transmission of the vertical scanning pulse. When identifying the low-level potential of the touch detection period identification signal TSHD, the drive electrode driver 14 supplies the display driving voltage VCOM, which is a display voltage, to the drive electrode COML. For example, when the low-level potential of the touch detection period identification signal TSHD is input, the first gate driver 12A and the second gate driver 12P alternately select the scanning line GCL from an (s+t+1)-th stage in the display operation period Pd (display operation period Pd3) and the source driver 13 performs the display operation of writing display data up to an (s+t+p)-th stage (p is an integer equal to or greater than 2) of the scanning lines GCL through the signal lines SGL.

Then, when identifying the high-level potential of the touch detection period identification signal TSHD (Active), the first gate driver 12A and the second gate driver 12B stop the transmission of the vertical scanning pulse, supply the lower-level potential VGL to the scanning lines GCL, and enter the idle period Pt (idle period Pt3). In the idle period Pt, the source driver 13 stops the display operation of writing display data to the sub-pixels SPix through the signal lines SGL. Then, the drive electrode driver 14 supplies the touch driving signal VcomAC to the drive electrode COML of the display unit 10 with a touch detection function on the basis of the control signal supplied from the control unit 11. The touch detection unit 40 detects whether the touch detection device 30 is touched (in the contact or proximity state) on the basis of the control signal supplied from the control unit 11 and the touch detection signal Vdet supplied from the touch detection device 30 of the display unit 10 with a touch detection function, and calculates, for example, the coordinates of a touch point in the touch detection region when the touch detection device 30 is touched.

As described above, the display device 1 with a touch detection function according to the embodiment detects a touch in the idle period Pt in which display is stopped between the display operations (between the display operation periods Pd). Therefore, it is possible to reduce an influence on display in the touch detection operation.

The first gate driver 12A (second gate driver 12B) illustrated in FIGS. 19, 20, and 21 transmits a vertical scanning pulse Vgate, which is a square wave formed by the high-level potential VGH and the low-level potential VGL, to the scanning line $GCL_s$ in order to select each row of the sub-pixels SPix in the display region Ad in the display operation period Pd illustrated in FIG. 22. It is more preferable that the idle period Pt illustrated in FIG. 22 be sufficiently temporally separated from the rising edge and the falling edge of the vertical scanning pulse Vgate before and after the idle period Pt.

Figure 23:
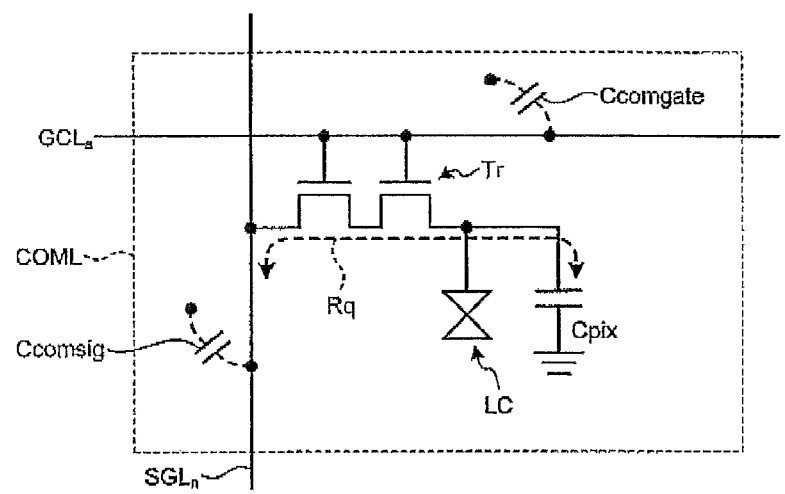
FIG. 23 is a diagram illustrating coupling capacitance between a common electrode and the scanning line of the display device.

The first gate driver 12A (second gate driver 12B) illustrated in FIG. 19 is coupled to one end of the scanning line $GCL_s$ in the extension direction. When a terminal coupled to the first gate driver 12A (second gate driver 12B) is a near end (vertical drive circuit connection end) Ps, the terminal which is not coupled to the first gate driver 12A (second gate driver 12B) is a far end Pe. At the far end Pe of the scanning line $GCL_s$, resistance Rgate and capacitor capacitance Cgate are more than those at the near end Ps of the scanning line $GCL_s$ and there is a difference in the time constant of a pulse, which is a function of the product of the resistance Rgate and the capacitor capacitance Cgate. At the far end Pe illustrated in FIG. 19, the discharge switch SW is not provided, but only the capacitor capacitance Cgate is provided. FIG. 23 is a diagram illustrating the coupling capacitance between the common electrode and the scanning line of the display device.

As illustrated in FIG. 23, coupling capacitance Ccomgate is generated between the scanning line $GCL_g$ and the drive electrode COML which is a common electrode of the display device. Similarly, capacitance Ccomsig is generated between the signal line $SGL_n$ and the drive electrode COML which is a common electrode of the display device. Further, capacitance Cpix is generated between the pixel electrode and the drive electrode COML and the pixel signal Vpix is held therebetween. As described above, in the idle period Pt, the drive electrode driver 14 supplies the touch driving signal VcomAC to the drive electrode COML. Therefore, in the idle period Pt illustrated in FIG. 22, the potential of the drive electrode COML varies. In FIG. 22, the touch driving signal VcomAC, which is potential applied to the drive electrode COML, is schematically described as one square wave. However, the touch driving signal VcomAC may be a variation in a plurality of potentials such as the AC square wave Sg illustrated in FIG. 6.

The low-level potential VGL is directly supplied to the near end Ps of the scanning line $GCL_s$ illustrated in FIG. 19 in the idle period Pt. In contrast, the low-level potential VGL which is applied to the near end Ps is applied to the far end Pe of the scanning line $GCL_s$ illustrated in FIG. 19 through a plurality of resistors Rgate and a plurality of capacitor capacitances Cgate in the idle period Pt. When the potential of the drive electrode COML is changed, an influence (coupling) occurs through the coupling capacitance Ccomgate and a variation (noise) may occur in the potential of the scanning line $GCL_s$. Since the low-level potential VGL is directly supplied to the near end Ps of the scanning line $GCL_s$, a variation in the potential of the scanning line $GCL_s$ through the coupling capacitance Ccomgate is suppressed. However, the potential of the far end Pe of the scanning line $GCL_s$ illustrated in FIG. 19 may cause noise NP which is a potential variation illustrated in FIG. 22. The noise NP causes a leakage current Rq illustrated in FIG. 23 between the signal line SGL and the capacitance Cpix and an operation error may occur in the TFT element Tr. As a result, the quality of the display region Ad may deteriorate.

It is effective that the first gate driver 12A and the second gate driver 12B which are arranged such that the scanning line $GCL_s$ is interposed therebetween in the extension direction of the scanning line $GCL_s$ supply the low-level potential VGL of the vertical scanning pulse Vgate from both ends of the scanning line $GCL_s$ in order to reduce the influence of the noise NP of the scanning line caused by a variation in the potential of the drive electrode COML as a common electrode for display, as illustrated in FIG. 20. The distance of the far end Pe of the scanning line $GCL_s$ illustrated in FIG. 20 from the near end Ps1 and the near end Ps2 of the scanning line $GCL_s$ is half the distance of the far end Pe of the scanning line $GCL_s$ illustrated in FIG. 19 from the near end Ps1 and the near end Ps2. Therefore, the time constant of the scanning line $GCL_s$ illustrated in FIG. 20 which is affected by the resistance Rgate and the capacitor capacitance Cgate can be about one-fourth of the time constant of the scanning line $GCL_s$ illustrated in FIG. 19. As a result, it is possible to improve the quality of the display region Ad including the scanning line $GCL_s$ illustrated in FIG. 20. However, the first gate driver 12A (second gate driver 12B) is coupled to the end of each scanning line $GCL_s$ and selects each row of the sub-pixels SPix in the display region Ad from both ends of the scanning line $GCL_s$. Therefore, the number of TFT elements Tr in the first gate driver 12A (second gate driver 12B) increases and the area of the circuit increases. As a result, the size of the frame Gd increases.

In the display device 1 with a touch detection function according to the embodiment, as illustrated in FIG. 21, the first gate driver 12A (second gate driver 12B) is coupled to one end of each scanning line $GCL_s$ in the extension direction. The terminal coupled to the first gate driver 12A (second gate driver 12B) is the near end Ps, and the terminal which is not coupled to the first gate driver 12A (second gate driver 12B) is the far end Pe. The discharge switch SW is coupled to the far end Pe of the scanning line $GCL_s$. As described above, the discharge switch SW is a circuit in which the number of transistor elements is less than the number of circuits forming the first gate driver 12A (second gate driver 12B). Since the first gate driver 12A (second gate driver 12B) selects each row of the sub-pixels SPix in the display region Ad from the near end Ps of the scanning line $GCL_s$, it is possible to reduce the number of TFT elements Tr to be less than that in the first gate driver 12A (second gate driver 12B) illustrated in FIG. 20. When the number of TFT elements Tr is reduced, the area of the circuit is reduced and it is possible to narrow the frame Gd.

The discharge switch SW supplies the low-level potential VGL of the vertical scanning pulse Vgate to the far end Pe of the scanning line $GCL_s$, in response to the input of the switch control signal GCK. For example, as illustrated in FIG. 16 or 22, when identifying the high-level potential of the touch detection period identification signal TSHD (Active), the COG 19 transmits the high-level potential (Active) of the switch control signal GCK to the discharge switch SW at the same time or immediately after identifying the high-level potential of the touch detection period identification signal TSHD. The switch control signal GCK may be transmitted from a circuit other than the COG 19, such as the transmission circuit 61.

The low-level potential vGL is directly supplied to the near end Ps of the scanning line GCL, illustrated in FIG. 21 in the idle period Pt. In addition, the low-level potential VGL is supplied from the discharge switch SW to the far end Pe of the scanning line $GCL_s$ illustrated in FIG. 21 in the idle period Pt. When the potential of the drive electrode COML varies, an influence (coupling) occurs through the coupling capacitance Ccomgate and a variation (noise) may occur in the potential of the scanning line $GCL_s$. However, since the low-level potential VGL is directly supplied to the near end Ps and the far end Pe of the scanning line $GCL_s$, a variation in the potential of the scanning line $GCL_s$ through the coupling capacitance Ccomgate, that is, noise NQ is suppressed. The time constant affected by the resistance Rgate and the capacitor capacitance Cgate can be about one-fourth of that of the scanning line $GCL_s$ illustrated in FIG. 19 between the near end Ps and the far end Pe of the scanning line $GCL_s$ and the influence of noise is suppressed. As such, in the idle period Pt, the scanning line $GCL_s$ may be fixed to the low-level potential VGL and a variation in the potential of the scanning line $GCL_s$ through the coupling capacitance Ccomgate, that is, the noise NQ is suppressed.

As illustrated in FIG. 22, when identifying the low-level potential of the touch detection period identification signal TSHD, the COG 19 transmits the low-level potential of the switch control signal GCK to the discharge switch SW at the same time as the low-level potential of the touch detection period identification signal TSHD is identified or immediately before the low-level potential of the touch detection period identification signal TSHD is identified. Therefore, the first gate driver 12A (second gate driver 12B) can transmit the vertical scanning pulse Vgate from the near end Ps of the scanning line $GCL_s$ in the extension direction and start the display operation period Pd.

The discharge switch SW may also give the same potential as that given by the first gate driver 12A or the second gate driver 12B in a transient period from the start of the falling edge of the vertical scanning pulse Vgate applied to the scanning line $GCL_s$ and to immediately before the rising edge of the vertical scanning pulse Vgate applied to the next scanning line $GCL_{s+1}$ in the display operation period Pd. Thereby, the vertical scanning pulse Vgate applied to the scanning line $GCL_s$ falls sharply and the falling edge of the vertical scanning pulse Vgate applied to the scanning line $GCL_s$ can be temporally separated from the rising edge of the vertical scanning pulse Vgate applied to the next scanning line $GCL_{s+1}$. In this case, the display device 1 with a touch detection function according to the embodiment supplies the switch control signal GCK to the discharge switch SW in each horizontal period (1H) of each stage. When the display device 1 with a touch detection function according to the embodiment supplies the switch control signal GCK to the discharge switch SW only in the idle period Pt to cause the discharge switch SW to operate, power consumption is about one-twentieth of that when the discharge switch SW is operated in both the display operation period Pd and the idle period Pt.

Figure 24:
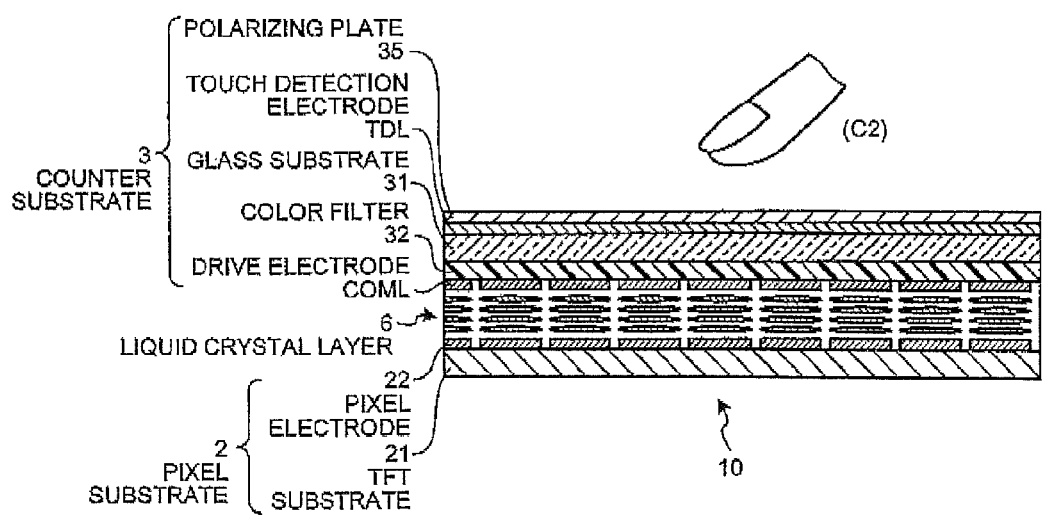
FIG. 24 is a cross-sectional view illustrating the schematic cross-sectional structure of a display unit with a touch detection function according to a modification.

FIG. 24 is a cross-sectional view illustrating the schematic cross-sectional structure of a display unit with a touch detection function according to a modification. In the display devices 1 with a touch detection function according to the above-described embodiment and the modification, the liquid crystal display unit 20 using various modes of liquid crystal, such as FFS and IPS modes, and the touch detection device 30 can be integrated into the display unit 10 with a touch detection function. Alternatively, in the display unit 10 with a touch detection function according to the modification illustrated in FIG. 24, the touch detection device may be integrated with various modes of liquid crystal, such as a twisted nematic (TN) mode, a vertical alignment (VA) mode, and an electrically controlled birefringence (ECB) mode.

In the above-described embodiment, the display device in which the capacitive touch detection device 30 is integrated with the liquid crystal display unit 20 is described. However, the configuration is not limited thereto. For example, a display device may be a device in which the capacitive touch detection device 30 is mounted on the liquid crystal display unit 20. In a case of the display device in which the capacitive touch detection device 30 is mounted on the liquid crystal display unit 20, the drive electrode COML of the pixel substrate 2 illustrated in FIG. 8 is a first drive electrode COML, a second drive electrode COML is provided on the surface of the glass substrate 31 in the counter substrate 3, and the first drive electrode COML is electrically coupled to the second drive electrode COML. In this case, the above-mentioned configuration makes it possible to detect a touch while reducing the influence of external noise or noise transmitted from the liquid crystal display unit (corresponding to internal noise in the above-described embodiment).

1-1C. Effect

As described above, the display device 1 with a touch detection function according to the embodiment includes the discharge switch SW which is coupled to the far end Pe opposite to the near end (vertical drive circuit connection end) Ps of the scanning line GCL coupled to the first gate driver 12A or the second gate driver 12B. The discharge switch SW gives the same potential as that given by the first gate driver 12A or the second gate driver 122 in the idle period Pt in which the source driver 13 stops the display operation of supplying the image signal Vsig. Therefore, the display device 1 with a touch detection function according to the embodiment can prevent an increase in the size of the frame Gd and the possibility of the leakage current Rq flowing between the capacitor Cpix and the signal line SGL in the idle period Pt in which display is stopped between the display operations. As a result, the display device according to the embodiment can prevent deterioration of the quality of the display region Ad. The display device 1 with a touch detection function according to the embodiment includes the drive electrode COML which is given the driving signal VcomAC in the idle period Pt, the touch detection electrode TDL which forms capacitance together with the drive electrode COML, and the touch detection unit 40 which detects the position of an approaching object on the basis of the detection signal from the touch detection electrode TDL, and can detect an external proximity object which approaches the display region Ad from the outside.

1-2. Display Device

Some display devices without a touch detection function which perform a driving operation of changing a common electrode for display other than a display driving operation in an idle period in which display is stopped between the display operations. The display device 1 with a touch detection function has been described above, but the preset disclosure is not limited to the display device with a touch detection function. The following display device differs from the display device 1 with a touch detection function in that the configuration for detecting a touch is not provided, but the liquid crystal display unit 20 and a control device are provided. The same components as those in the above-described embodiment are denoted by the same reference numerals and the description thereof will not be repeated.

Figure 25:
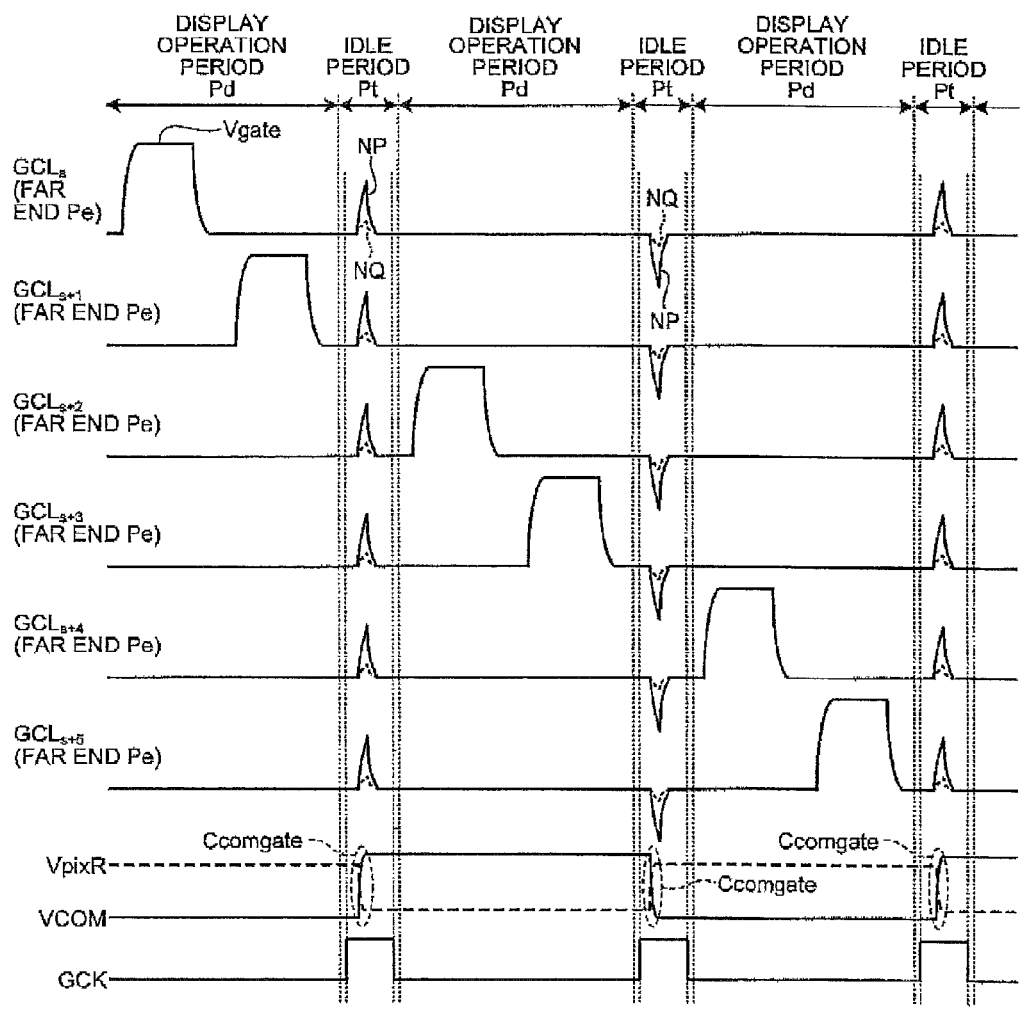
FIG. 25 is a diagram illustrating a variation in the potential of the scanning line according to the embodiment.
Figure 26:
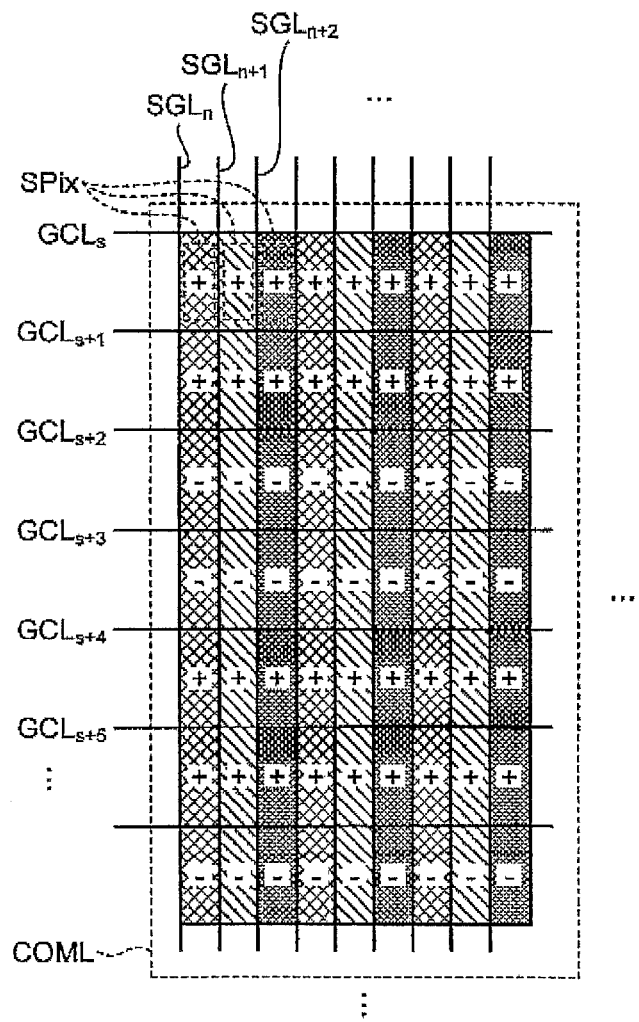
FIG. 26 is a diagram schematically illustrating common potential inversion driving in two horizontal periods.

FIG. 25 is a diagram illustrating a change in the potential of a scanning line according to the embodiment. FIG. 26 is a diagram schematically illustrating common potential inversion driving for two horizontal periods. In the display device, when a DC voltage with the same polarity is continuously applied to a liquid crystal element LC, the resistivity (specific resistance) of liquid crystal may deteriorate.

The display device inverts the polarity of the common potential of the drive electrode COML, that is, the display driving voltage VCOM for every two horizontal period in order to prevent deterioration of the resistivity (specific resistance) of liquid crystal, and inverts the polarity of the pixel signals Vpix (VpixR, VpixG, and VpixB) in a predetermined cycle on the basis of the common potential. For example, as illustrated in FIG. 25, the polarity of the display driving voltage VCOM of the drive electrode COML is inverted for every two horizontal period and the polarity of the pixel signal VpixR is inverted in a predetermined cycle on the basis of the common potential. In this way, as illustrated in FIG. 26, the polarity of the pixel signals Vpix (VpixR, VpixG, and VpixB) applied to the sub-pixels SPix are alternately changed between the positive (+) polarity and the negative (−) polarity for every two horizontal lines. As a result, the display device can prevent, for example, deterioration of the resistivity (specific resistance) of liquid crystal.

As illustrated in FIG. 23, the coupling capacitance Ccomgate is generated between the scanning line $GCL_s$ and the drive electrode COML which is a common electrode of the display device. Similarly, the capacitance Ccomsig is generated between the signal line $SGL_n$ and the drive electrode COML which is the common electrode of the display device. As illustrated in FIG. 25, the potential of the drive electrode COML varies in the idle period Pt in which the polarity of the display driving voltage VCOM of the drive electrode COML is inverted in every two horizontal periods. When the potential of the drive electrode COML varies, an influence (coupling) occurs through the coupling capacitance Ccomgate and a variation (noise) may occur in the potential of the scanning line $GCL_s$. Since the low-level potential VGL is directly supplied to the near end Ps of the scanning line $GCL_s$, a variation in the potential of the scanning line $GCL_s$ through the coupling capacitance Ccomgate is suppressed. However, the potential of the far end Pe of the scanning line $GCL_s$ illustrated in FIG. 19 may cause the noise NP which is a potential variation illustrated in FIG. 22. The noise NP may cause the leakage current Rq illustrated in FIG. 23 between the signal line SGL and the capacitance Cpix. As a result, the quality of the display region Ad may deteriorate.

In the display device according to the embodiment, as illustrated in FIG. 21, the first gate driver 12A (second gate driver 12B) is coupled to one end of the scanning line $GCL_s$ in the extension direction. The terminal coupled to the first gate driver 12A (second gate driver 12B) is the near end Ps, and the terminal which is not coupled to the first gate driver 12A (second gate driver 12B) is the far end P. The discharge switch SW is coupled to the far end Pe of the scanning line $GCL_s$. The discharge switch SW supplies the low-level potential VGL of the vertical scanning pulse Vgate to the far end Pe of the scanning line $GCL_s$, in response to the input of the switch control signal GCK. For example, as illustrated in FIG. 25, the COG 19 transmits the high-level potential of the switch control signal GCK to the discharge switch SW in the idle period Pt. The switch control signal GCK may be transmitted from a circuit, such as the transmission circuit 61, other than the COG 19.

The low-level potential VGL is directly supplied to the near and Ps of the scanning line $GCL_s$ illustrated in FIG. 21 in the idle period Pt. The low-level potential VGL is supplied from the discharge switch SW to the far end Pe of the scanning line $GCL_s$ illustrated in FIG. 21 in the idle period Pt. When the potential of the drive electrode COML varies, an influence (coupling) occurs through the coupling capacitance Ccomgate and a variation (noise) may occur in the potential of the scanning line $GCL_s$. However, in the display device according to the embodiment, since the low-level potential VGL is directly supplied to the near end Ps and the far end Pe of the scanning line $GCL_s$, a variation in the potential of the scanning line $GCL_s$ through the coupling capacitance Ccomgate, that is, noise NQ is suppressed. The time constant affected by the resistance Rgate and the capacitor capacitance Cgate can be about one-fourth of that of the scanning line GCL illustrated in FIG. 19 between the near end Ps and the far end Pe of the scanning line $GCL_s$ and the influence of noise is suppressed.

After the polarity of the common potential is inverted as illustrated in FIG. 25, the COG 19 transmits the low-level potential of the switch control signal GCK to the discharge switch SW. Then, the first gate driver 12A (second gate driver 12B) can transmit the vertical scanning pulse Vgate from the near end Ps of the scanning line $GCL_s$ in the extension direction and start the display operation period Pd.

The discharge switch SW may give the same potential as that given by the first gate driver 12A or the second gate driver 12B in a transient period from the start of the falling of the vertical scanning pulse Vgate applied to the scanning line $GCL_s$ and to immediately before the rising of the vertical scanning pulse Vgate applied to the next scanning line $GCL_s$ in the display operation period Pd. Thereby, the vertical scanning pulse Vgate applied to, the scanning line $GCL_s$ falls sharply and the falling edge of the vertical scanning pulse Vgate applied to the scanning line $GCL_s$ can be temporally separated from the rising edge of the vertical scanning pulse Vgate applied to the next scanning line $GCL_{s+1}$. In this case, the display device according to the embodiment supplies the switch control signal GCK to the discharge switch SW in each horizontal period (1H) of each stage. When the display device according to the embodiment supplies the switch control signal GCK to the discharge switch SW only in the idle period Pt to cause the discharge switch SW to operate, power consumption is about half of that when the discharge switch SW is operated in both the display operation period Pd and the idle period Pt.

1-2A. Effect

As described above, the display device according to the embodiment includes the discharge switch SW which is coupled to the far end Pe opposite to the near end (vertical drive circuit connection end) Ps of the scanning line GCL coupled to the first gate driver 12A or the second gate driver 12B. The discharge switch SW gives the same potential as that given by the first gate driver 12A or the second gate driver 12B in the idle period Pt in which the source driver 13 stops a display operation of supplying the image signal Vsig to each sub-pixel Spix through the signal line SGL. Therefore, the display device according to the embodiment can prevent an increase in the size of the frame Gd and the possibility of a leakage current Rq flowing between the capacitor Cpix and the signal line SGL in the idle period Pt, in which display is stopped, between the display operations. As a result, the display device according to the embodiment can prevent deterioration of the quality of the display region Ad. In the display device according to the embodiment, the polarity of the common potential applied to the drive electrode COML, which is a common electrode, is switched in the idle period Pt. Therefore, it is possible to maintain the performance of the liquid crystal element LC.

Embodiments and modifications have been described above. However, the preset disclosure is not limited thereto, and various modifications and changes of the preset disclosure can be made.

2. Application Examples

Applications of the display device 1 with a touch detection function according to the embodiment and modification will be described with reference to FIGS. 27 to 39. FIGS. 27 to 39 are diagrams illustrating examples of electronic apparatuses to which the display device with a touch detection function or the display device according to the embodiment is applied. The display device 1 with a touch detection function and the display device according to the embodiment and the modification can be applied to all fields of electronic apparatuses, such as televisions, digital cameras, notebook personal computers, portable terminal apparatuses including mobile phones, and video cameras. In other words, the display device 1 with a touch detection function and the display device according to the embodiment and the modification can be applied to all fields of electronic apparatuses which display a video signal input from the outside or a video signal generated from the inside as an image or a video.

Application 1

Figure 27:
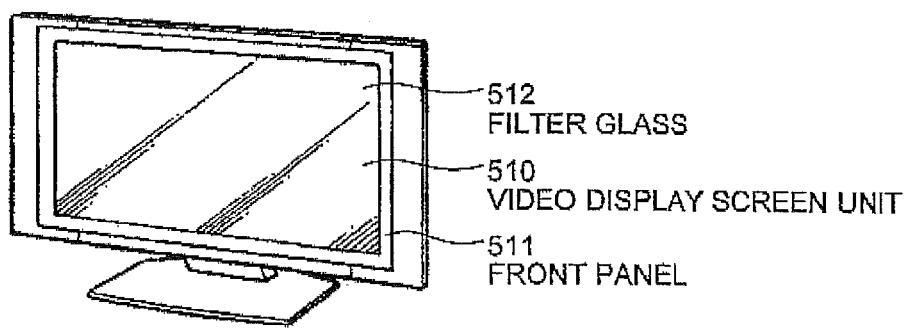
FIG. 27 is a diagram illustrating an example of an electronic apparatus to which the display device with a touch detection function or the display device according to the embodiment is applied.

The electronic apparatus illustrated in FIG. 27 is a television to which the display device 1 with a touch detection function and the display device according to the embodiment and the modification are applied. The television includes, for example, a front panel 511 and a video display screen unit 510 including a filter glass 512. The image display screen unit 510 is the display device 1 with a touch detection function and the display device according to the embodiment and the modification.

Application 2

Figure 28:
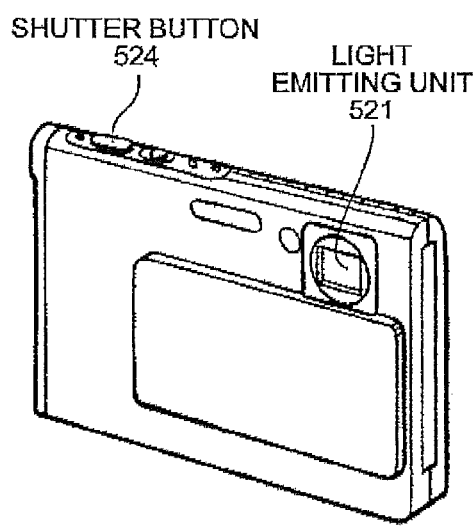
FIG. 28 is a diagram illustrating an example of the electronic apparatus to which the display device with a touch detection function or the display device according to the embodiment is applied.
Figure 29:
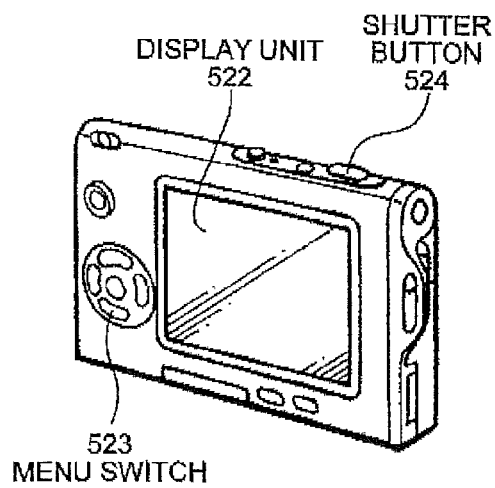
FIG. 29 is a diagram illustrating an example of the electronic apparatus to which the display device with a touch detection function or the display device according to the embodiment is applied.

The electronic apparatus illustrated in FIGS. 28 and 29 is a digital camera to which the display device 1 with a touch detection function and the display device according to the embodiment and the modification are applied. The digital camera includes, for example, a flash light emitting unit 521, a display unit 522, a menu switch 523, and a shutter button 524. The display unit 522 is the display device 1 with a touch detection function and the display device according to the embodiment and the modification.

Application 3

Figure 30:
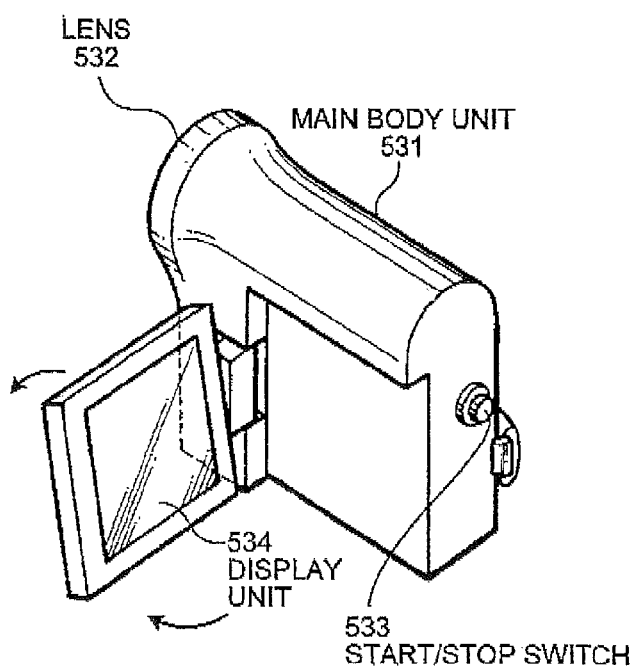
FIG. 30 is a diagram illustrating an example of the electronic apparatus to which the display device with a touch detection function or the display device according to the embodiment is applied.

The electronic apparatus illustrated in FIG. 30 is the exterior of a video camera to which the display device 1 with a touch detection function and the display device according to the embodiment and the modification are applied. The video camera includes, for example, a main body unit 531, an object imaging lens 532 which is provided on the front surface of the main unit 531, a start/stop switch 533 for imaging, and a display unit 534. The display unit 534 is the display device 1 with a touch detection function and the display device according to the embodiment and the modification.

Application 4

Figure 31:
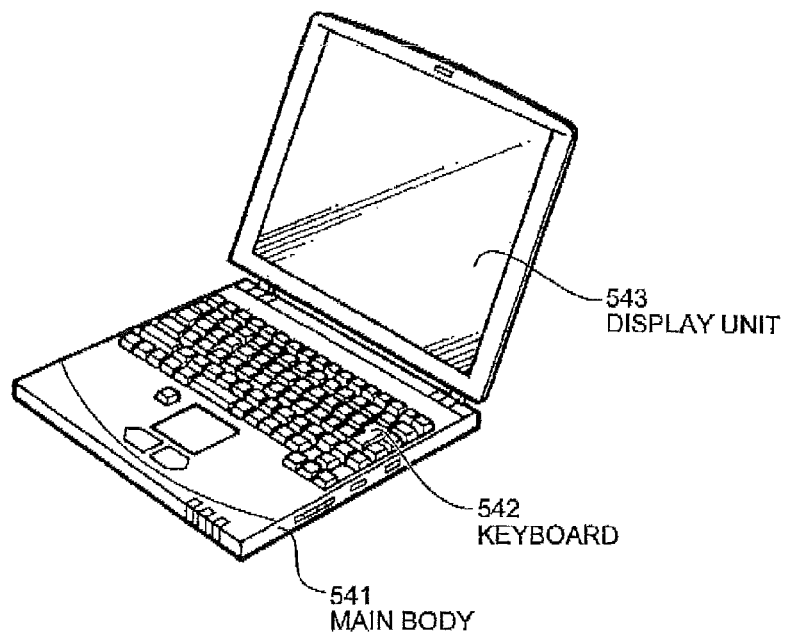
FIG. 31 is a diagram illustrating an example of the electronic apparatus to which the display device with a touch detection function or the display device according to the embodiment is applied.
Figure 32:
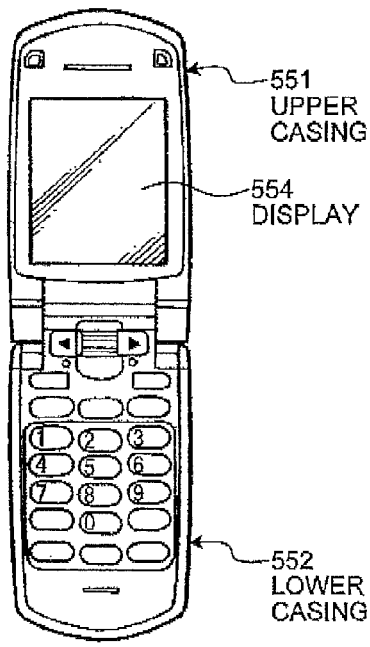
FIG. 32 is a diagram illustrating an example of the electronic apparatus to which the display device with a touch detection function or the display device according to the embodiment is applied.
Figure 33:
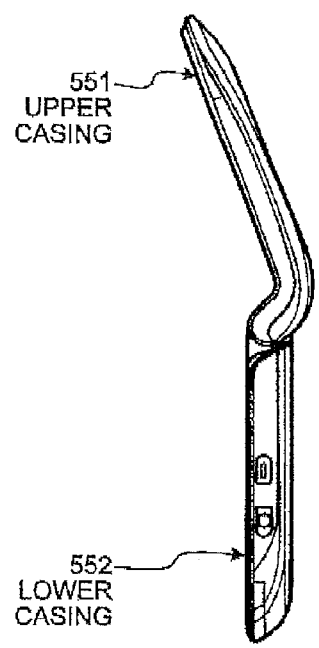
FIG. 33 is a diagram illustrating an example of the electronic apparatus to which the display device with a touch detection function or the display device according to the embodiment is applied.
Figure 34:
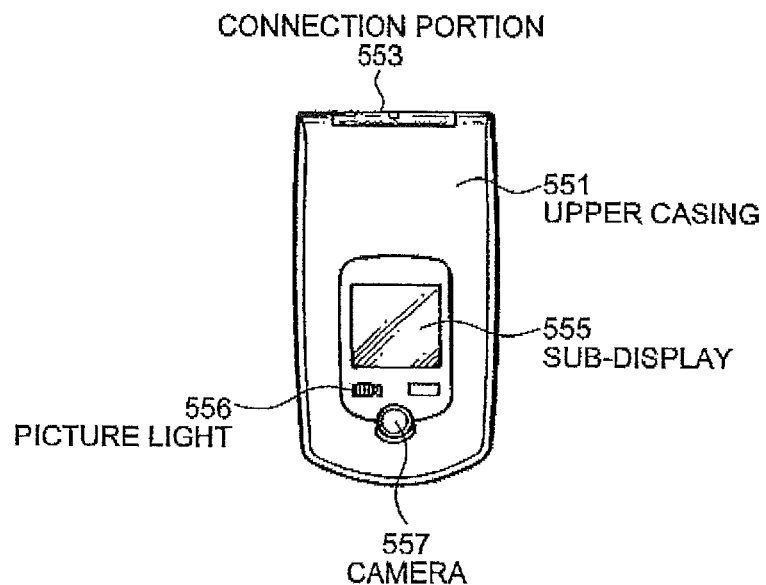
FIG. 34 is a diagram illustrating an example of the electronic apparatus to which the display device with a touch detection function or the display device according to the embodiment is applied.
Figure 35:
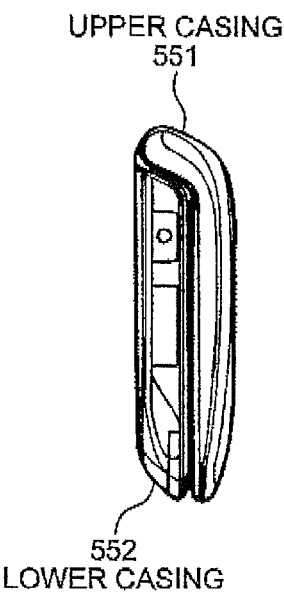
FIG. 35 is a diagram illustrating an example of the electronic apparatus to which the display device with a touch detection function or the display device according to the embodiment is applied.
Figure 36:
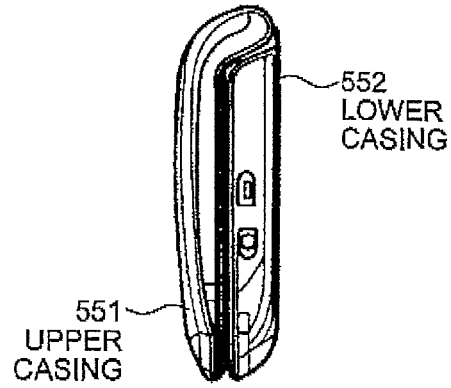
FIG. 36 is a diagram illustrating an example of the electronic apparatus to which the display device with a touch detection function or the display device according to the embodiment is applied.
Figure 37:
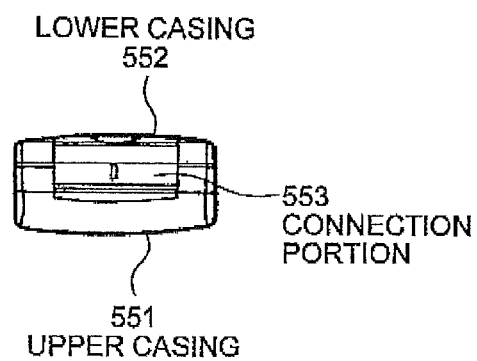
FIG. 37 is a diagram illustrating an example of the electronic apparatus to which the display device with a touch detection function or the display device according to the embodiment is applied.
Figure 38:
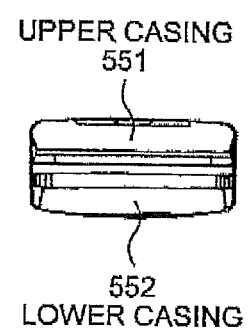
FIG. 38 is a diagram illustrating an example of the electronic apparatus to which the display device with a touch detection function or the display device according to the embodiment is applied.

The electronic apparatus illustrated in FIG. 31 is a notebook personal computer to which the display device 1 with a touch detection function and the display device according to the embodiment and the modification are applied. The notebook personal computer includes, for example, a main body 541, a keyboard 542 for inputting letters, and a display unit 543 which displays images. The display unit 543 is the display device 1 with a touch detection function and the display device according to the embodiment and the modification.

Application 5

The electronic apparatus illustrated in FIGS. 32 to 38 is a mobile phone to which the display device 1 with a touch detection function and the display device according to the embodiment and the modification are applied. The mobile phone is, for example, formed by connecting an upper casing 551 and a lower casing 552 with a connection portion (hinge portion) 553 and includes a display 554, a sub-display 555, a picture light 556, and a camera 557. The display 554 or the sub-display 555 is the display device 1 with a touch detection function and the display device according to the embodiment and the modification.

Application 6

Figure 39:
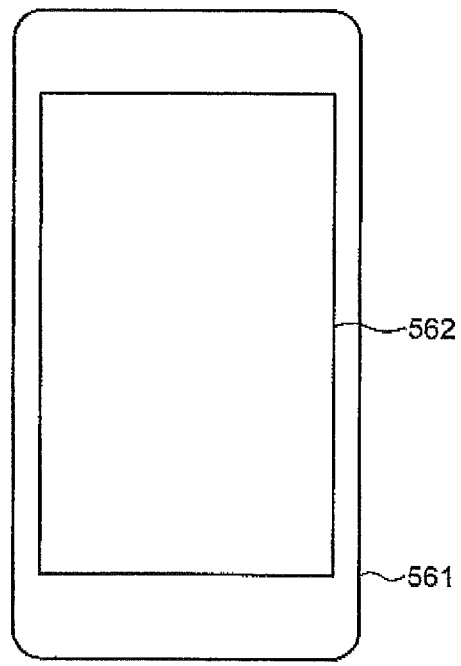
FIG. 39 is a diagram illustrating an example of the electronic apparatus to which the display device with a touch detection function or the display device according to the embodiment is applied.

The electronic apparatus illustrated in FIG. 39 is a portable information terminal which is called a smart phone or a so-called tablet terminal that functions as a portable computer, a multi-functional mobile phone, a portable computer which can perform voice communication, or a portable computer which can perform communication. The portable information terminal includes, for example, a display unit 562 which is provided on the surface of a casing 561. The display unit 562 is the display device 1 with a touch detection function and the display device according to the embodiment and the modification.

3. Aspects of Present Disclosure

The present disclosure includes the following aspects.

(1) A display device comprising:
a display region in which a plurality of pixels are arranged in a matrix;
a frame region outside the display region;

a common electrode that gives a common potential to the corresponding pixels;

a plurality of scanning lines that extend in a first direction in the display region;

a plurality of signal lines that extend in a second direction in the display region;

first and second vertical drive circuits that are arranged in the frame region such that the scanning lines are interposed therebetween in the first direction, the first and second vertical drive circuits being configured to alternately apply a vertical scanning pulse in the first direction to select each row of the pixels in the display region;

a horizontal drive circuit that performs a display operation of supplying an image signal to each of the pixels in the row selected by the first vertical drive circuit or the second vertical drive circuit through the signal lines; and a plurality of switches each of which is coupled to an end opposite to a vertical drive circuit connection end of each scanning line which is coupled to the first vertical drive circuit or the second vertical drive circuit, wherein the switches supply the same potential as that supplied to the scanning line by the first vertical drive circuit or the second vertical drive circuit to the scanning line in an idle period in which the horizontal (2) The display device according to (1), wherein the switches supply a lower-level potential of the vertical scanning pulse to the scanning line which is coupled thereto.

(3) The display device according to (1), wherein the switches include a plurality of switches which are arranged close to the first vertical drive circuit and a plurality of switches which are arranged close to the second vertical drive circuit, and operate at the same time in operative association with the plurality of switches close to the first vertical drive circuit or the plurality of switches close to the second vertical drive circuit.

(4) The display device according to (1), further comprising a touch detection device configured to detect an external proximity object which approaches the display region from the outside, the touch detection device including (a) a drive electrode to which a driving signal is supplied in the idle period, (b) a touch detection electrode which forms capacitance together with the drive electrode, and (c) a touch detection unit which detects the position of an approaching object on the basis of a detection signal from the touch detection electrode.

(5) The display device according to (4), wherein the drive electrode serves as the common electrode and supplies the common potential to each of the pixels when the display operation is performed.

(6) The display device according to (1), wherein the polarity of the common potential supplied to the common electrode is switched in the idle period.

(7) A method of driving a display device including:

a display region in which a plurality of pixels are arranged in a matrix;

a frame region outside the display region;

a common electrode that gives a common potential to the corresponding pixels;

a plurality of scanning lines that extend in a first direction in the display region;

a plurality of signal lines that extend in a second direction in the display region;

first and second vertical drive circuits that are arranged in the frame region such that the scanning lines are interposed therebetween in the first direction, the first and second vertical drive circuits being configured to alternately apply a vertical scanning pulse in the first direction to select each row of the pixels in the display region;

a horizontal drive circuit that performs a display operation of supplying an image signal to each of the pixels in the row selected by the first vertical drive circuit or the second vertical drive circuit through the signal lines; and a plurality of switches each of which is coupled to an end opposite to a vertical drive circuit connection end of each scanning line which is coupled to the first vertical drive circuit or the second vertical drive circuit, the method comprising:

the switches supplying the same potential as that supplied to the scanning line by the first vertical drive circuit or the second vertical drive circuit to the scanning line in an idle period in which the horizontal drive circuit stops the display operation.

(8) An electronic apparatus having a display device, the display device comprising:

a display region in which a plurality of pixels are arranged in a matrix;

a frame region outside the display region;

a common electrode that gives a common potential to the corresponding pixels;

a plurality of scanning lines that extend in a first direction in the display region;

a plurality of signal lines that extend in a second direction in the display region;

first and second vertical drive circuits that are arranged in the frame region such that the scanning lines are interposed therebetween in the first direction, the first and second vertical drive circuits being configured to alternately apply a vertical scanning pulse in the first direction to select each row of the pixels in the display region;

a horizontal drive circuit that performs a display operation of supplying an image signal to each of the pixels in the row selected by the first vertical drive circuit or the second vertical drive circuit through the signal lines; and a plurality of switches each of which is coupled to an end opposite to a vertical drive circuit connection end of each scanning line which is coupled to the first vertical drive circuit or the second vertical drive circuit, wherein the switches supply the same potential as that supplied to the scanning line by the first vertical drive circuit or the second vertical drive circuit to the scanning line in an idle period in which the horizontal drive circuit stops the display operation.

(9) A display device comprising:

a display region in which a plurality of pixels are arranged in a matrix;

a plurality of scanning lines that extend in a first direction in the display region;

a plurality of signal lines that extend in a second direction in the display region;

a vertical drive circuit that is coupled to first ends of the scanning lines and applies a vertical scanning pulse to the first ends to select each row of the pixels in the display region;

a horizontal drive circuit that performs a display operation of supplying an image signal to each of the pixels in the row selected by the vertical drive circuit through the signal lines; and a plurality of switches that are coupled to second ends of the scanning lines respectively, wherein each of the switches supplies the same potential as that supplied to the first ends by the vertical drive circuit to the second end corresponding thereto in an idle period in which the horizontal drive circuit stops the display operation.

According to one aspect, a display device, a method of driving a display device, and an electronic apparatus can suppress the noise of a scanning line while narrowing a frame.

What is claimed is:

1. A display device comprising:
    a display region in which a plurality of pixels are arranged in a matrix;
    a frame region outside the display region;
    a common electrode that gives a common potential to the corresponding pixels;
    a plurality of scanning lines that extend in a first direction in the display region;
    a plurality of signal lines that extend in a second direction in the display region;
    first and second vertical drive circuits that are arranged in the frame region such that the scanning lines are interposed therebetween in the first direction, the first and second vertical drive circuits being configured to alternately apply a vertical scanning pulse in the first direction to select each row of the pixels in the display region;
    a horizontal drive circuit that performs a display operation of supplying an image signal to each of the pixels in the row selected by the first vertical drive circuit or the second vertical drive circuit through the signal lines; and
    a plurality of switches connected to the scanning lines at ends other than ends connected to the first vertical drive circuit or the second vertical drive circuit, wherein
    the switches supply, in an idle period in which the horizontal drive circuit stops the display operation, the same potential as that supplied to the scanning line by the first vertical drive circuit or the second vertical drive circuit to the scanning line.

2. The display device according to claim 1, wherein
    the switches supply a lower-level potential of the vertical scanning pulse to the scanning line which is coupled thereto.

3. The display device according to claim 1, wherein
    the switches include a plurality of switches which are arranged close to the first vertical drive circuit and a plurality of switches which are arranged close to the second vertical drive circuit, and operate at the same time in operative association with the plurality of switches close to the first vertical drive circuit or the plurality of switches close to the second vertical drive circuit.

4. The display device according to claim 1, further comprising a touch detection device configured to detect an external proximity object which approaches the display region from the outside, the touch detection device including
    (a) a drive electrode to which a driving signal is supplied in the idle period,
    (b) a touch detection electrode which forms capacitance together with the drive electrode, and
    (c) a touch detection unit which detects the position of an approaching object on the basis of a detection signal from the touch detection electrode.

5. The display device according to claim 4, wherein
    the drive electrode serves as the common electrode and supplies the common potential to each of the pixels when the display operation is performed.

6. The display device according to claim 1, wherein the polarity of the common potential supplied to the common electrode is switched in the idle period.

7. A method of driving a display device, the display device including: pixels arranged in a matrix, a plurality of scanning lines that extend in a first direction, a plurality of signal lines that extend in a second direction, first and second vertical drive circuits that are arranged such that the scanning lines are interposed therebetween in the first direction, a horizontal drive circuit, and a plurality of switches connected to the scanning lines at ends other than ends connected to the first vertical drive circuit or the second vertical drive circuit, the method comprising:
    applying a vertical scanning pulse in the first direction to select each row of the pixels alternatively by the first vertical drive circuit and the second vertical drive circuit;
    supplying an image signal to each of the pixels in the row selected by the first vertical drive circuit or the second vertical drive circuit through the signal lines to perform a display operation, by the horizontal drive circuit;
    supplying, in an idle period in which the horizontal drive circuit stops the display operation, the same potential as that supplied to the scanning line by the first vertical drive circuit or the second vertical drive circuit to the scanning line, by the switches.

8. An electronic apparatus having a display device, the display device comprising:
    a display region in which a plurality of pixels are arranged in a matrix;
    a frame region outside the display region;
    a common electrode that gives a common potential to the corresponding pixels;
    a plurality of scanning lines that extend in a first direction in the display region;
    a plurality of signal lines that extend in a second direction in the display region;
    first and second vertical drive circuits that are arranged in the frame region such that the scanning lines are interposed therebetween in the first direction, the first and second vertical drive circuits being configured to alternately apply a vertical scanning pulse in the first direction to select each row of the pixels in the display region;
    a horizontal drive circuit that performs a display operation of supplying an image signal to each of the pixels in the row selected by the first vertical drive circuit or the second vertical drive circuit through the signal lines; and
    a plurality of switches connected to the scanning lines at ends other than ends connected to the first vertical drive circuit or the second vertical drive circuit, wherein
    the switches supply, in an idle period in which the horizontal drive circuit stops the display operation, the same potential as that supplied to the scanning line by the first vertical drive circuit or the second vertical drive circuit to the scanning line.

9. A display device comprising:
    a display region in which a plurality of pixels are arranged in a matrix;
    a plurality of scanning lines that extend in a first direction in the display region;
    a plurality of signal lines that extend in a second direction in the display region;
    a vertical drive circuit that is coupled to first ends of the scanning lines and applies a vertical scanning pulse to the first ends to select each row of the pixels in the display region;
    a horizontal drive circuit that performs a display operation of supplying an image signal to each of the pixels in the row selected by the vertical drive circuit through the signal lines; and
    a plurality of switches that are coupled to second ends of the scanning lines respectively, wherein
    each of the switches supplies, in an idle period in which the horizontal drive circuit stops the display operation, the same potential as that supplied to the first ends by the vertical drive circuit to the second end corresponding thereto.

\* \* \* \* \*